United States Patent
Sato et al.

(10) Patent No.: US 8,656,882 B2
(45) Date of Patent: Feb. 25, 2014

(54) ENGINE IGNITION CONTROL DEVICE

(75) Inventors: Hiroyasu Sato, Numazu (JP); Kiyoshi Uemura, Numazu (JP); Tomoaki Sekita, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 12 days.

(21) Appl. No.: 13/575,451

(22) PCT Filed: Jan. 27, 2010

(86) PCT No.: PCT/JP2010/000453
§ 371 (c)(1),
(2), (4) Date: Jul. 26, 2012

(87) PCT Pub. No.: WO2011/092734
PCT Pub. Date: Aug. 4, 2011

(65) Prior Publication Data
US 2012/0291764 A1    Nov. 22, 2012

(51) Int. Cl.
*F02N 1/02* (2006.01)
*F02P 11/00* (2006.01)

(52) U.S. Cl.
USPC .............. 123/185.13; 123/179.5; 123/406.13; 123/406.53; 123/603

(58) Field of Classification Search
USPC .............. 123/179.5, 185.13, 406.13, 406.53, 123/603, 612
See application file for complete search history.

(56) References Cited

U.S. PATENT DOCUMENTS

| | | | | |
|---|---|---|---|---|
| 990,556 A | * | 4/1911 | Hodgkinson | 123/406.76 |
| 4,552,103 A | * | 11/1985 | Baltz et al. | 123/406.53 |
| 4,679,540 A | * | 7/1987 | Abe et al. | 123/179.5 |
| 5,622,153 A | * | 4/1997 | Ott et al. | 123/476 |
| 6,973,911 B2 | * | 12/2005 | Yamashita | 123/335 |
| 7,047,956 B2 | * | 5/2006 | Masaoka et al. | 123/631 |
| 7,431,014 B2 | | 10/2008 | Hirukawa | |
| 2007/0277782 A1 | * | 12/2007 | Nakauchi et al. | 123/406.53 |
| 2008/0163851 A1 | | 7/2008 | Kolossow | |
| 2011/0303189 A1 | * | 12/2011 | Andersson et al. | 123/406.53 |

FOREIGN PATENT DOCUMENTS

JP    2006-274998 A    10/2006
JP     2007170393 A     7/2007

OTHER PUBLICATIONS

International Search Report for PCT/JP2010/000453, dated Mar. 2, 2010.

* cited by examiner

*Primary Examiner* — Erick Solis
(74) *Attorney, Agent, or Firm* — Cooper Legal Group, LLC

(57) ABSTRACT

An engine ignition control device comprising: a start-up ignition controller having a function for preventing the occurrence of kickback by either delaying an ignition position of an engine or stopping ignition; start-up rotation angle detection means for detecting a rotation angle of a crankshaft of the engine after initiation of a start-up operation of the engine; and switching means for switching control specifics of the start-up ignition controller in accordance with the detected start-up rotation angle so that when the detected start-up rotation angle is less than a set angle, there is created a kickback-preventive effect within a range at which engine startability is not compromised, and when the detected start-up rotation angle is equal to or greater than the set angle, there is created a kickback-preventive effect that is greater than the kickback-preventive effect for when the start-up rotation angle is equal to or less than the set angle.

15 Claims, 13 Drawing Sheets

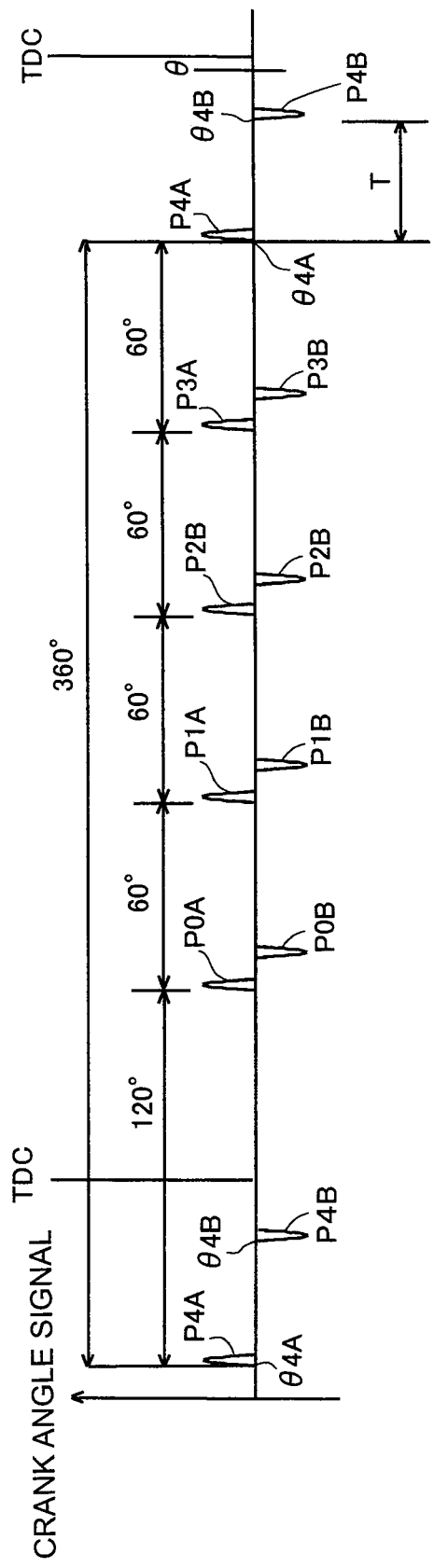

θ 11: REGULAR IGNITION POSITION WHEN KICK FORCE IS APPLIED
θ 12: MAXIMUM DELAY ANGLE POSITION WHEN KICK FORCE IS APPLIED
θ 21: REGULAR IGNITION POSITION WHEN KICK FORCE IS NOT APPLIED
θ 22: MAXIMUM DELAY ANGLE POSITION WHEN KICK FORCE IS NOT APPLIED (A) CAPACITOR TERMINAL VOLTAGE
(B) OUTPUT PULSE OF CRANK ANGLE SENSOR
(C) ENGINE INTAKE PRESSURE

ENGINE IGNITION CONTROL DEVICE

TECHNICAL FIELD OF THE INVENTION

The present invention relates to an engine ignition control device for controlling ignition of an engine started up using human power.

PRIOR ART

In an engine in which start-up is performed by a start-up device operated by human power, such as a recoil starter or a kick starter, when rotational force applied to a crankshaft at start-up is insufficient, a phenomenon occurs in which the rotational force is surpassed by reaction force that occurs with the compression of gas inside the cylinder and a piston is pushed back just short of top dead center. When ignition of the engine is performed before the piston reaches top dead center in a state in which insufficient rotational force is applied to the crankshaft by the start-up operation, a phenomenon occurs in which the piston is pushed back by explosive force. The kickback occurring due to the rotational force being surpassed by the compression force is referred to as compression kickback, and the kickback occurring during ignition is referred to as ignition combustion kickback. A large impact is not imparted to the operator even when compression kickback occurs, but since the piston is pushed back by a strong force generated by an explosion when ignition combustion kickback occurs, the operator suffers a large impact. Consequently, an engine started up using human power must be furnished with means for inhibiting the occurrence of ignition combustion kickback.

In view of this, as shown in Japanese Laid-open Patent Application No. 2006-274998 and U.S. Pat. No. 7,431,014, an engine ignition control device is provided in which a determination is made as to whether or not there is a risk of kickback occurring by detecting the amount of drop in rotational speed immediately before the ignition position at engine start-up, and the occurrence of kickback is suppressed by delaying angle of the ignition position when it is determined that there is a risk of kickback occurring.

As shown in Japanese Laid-open Patent Application No. 2006-274998 and U.S. Pat. No. 7,431,014, in cases in which control for delaying angle of the ignition position is performed to suppress the occurrence of kickback when it has been determined that there is a risk of kickback occurring from the amount of drop in rotational speed immediately before ignition, envisioning a case of the amount of drop in rotational speed being large, a large kickback-preventive effect works consistently due to the engine ignition being controlled so that the delaying angle amount of the ignition position is sufficiently large.

However, envisioning a case of the amount of drop in rotational speed being large, when a large delaying angle amount of the ignition position is set so as to obtain a consistent large kickback-preventive effect, there will be a weaker rotational torque (start-up torque) of the engine caused by the ignition combustion initially performed after engine start-up is initiated. Problems have therefore been encountered in which the rotational speed of the engine cannot be increased to the idling rotational speed and there is a high probability of failure in engine start-up.

SUMMARY OF THE INVENTION

An object of the present invention is to provide an engine ignition control device in which the occurrence of kickback can be effectively inhibited without compromising the startability of the engine.

The present invention is applied to an engine ignition control device for controlling ignition during start-up and during normal running of an engine in which start-up is performed using human power. The engine to which the present invention is applied may be a four-stroke engine or a two-stroke engine.

As a result of performing various experiments, the inventors discovered that mostly no ignition combustion kickback occurs in the (first) compression stroke initially performed after the start-up operation is initiated, and ignition combustion kickback occurs readily in the compression stroke performed second. It is thought that kickback does not readily occur in the initial compression stroke because operation force acts on the crankshaft from the start-up device and the piston is therefore not readily pushed back. It is also thought that the second and subsequent compression strokes take place in a state in which the start-up device operation is complete and operation force is not applied to the crankshaft, the piston is readily pushed back, and kickback occurs readily. It is believed that kickback occurs readily in the second compression stroke particularly when the start-up torque generated by the initial combustion is weak and the increase of the rotational speed of the engine is minimized.

The present invention was devised based on the above findings. In the present invention, there are provided a start-up ignition controller having a function for preventing the occurrence of kickback by either delaying an ignition position of the engine or stopping ignition when there is a risk of kickback occurring at the start-up of the engine; start-up rotation angle detection means for detecting a rotation angle of a crankshaft of the engine after initiation of a start-up operation of the engine as a start-up rotation angle; and switching means for switching control specifics of the start-up ignition controller in accordance with the detected start-up rotation angle so that when the start-up rotation angle detected by the start-up rotation angle detection means is less than a set angle, there is created a kickback-preventive effect within a range at which engine startability is not compromised, and when the detected start-up rotation angle is equal to or greater than the set angle, there is created a kickback-preventive effect that is greater than the kickback-preventive effect for when the start-up rotation angle is less than the set angle.

The set angle is preferably set to be virtually equal to an angle equivalent to a section in which operation force is applied from the start-up device to the crankshaft at engine start-up. In cases of a four-stroke engine in which a kick starter is used, it is adequate to set the set angle to 540°, for example.

Control for delaying angle of the ignition position and control for stopping ignition are often performed as engine ignition control for obtaining a kickback-preventive effect. Commonly, when engine ignition is controlled so as to increase the kickback-preventive effect (for example, when the delaying angle amount of the engine ignition position is increased), the engine output torque that occurs with the first explosion weakens, the rotational speed of the engine therefore does not readily increase, and there is a risk of failure in the start-up of the engine.

When the fluctuation range of the rotational speed of the crankshaft at start-up is within the usual estimated range, for example, a position near the advanced end of the ignition range in which the engine can be started up without causing kickback is used as the start-up regular ignition position and the engine is ignited at this regular ignition position so as to obtain a comparatively weak kickback-preventive effect, whereupon a high torque can be generated in the engine by the initial explosion to quickly increase the rotational speed of the engine, and satisfactory engine startability can therefore be achieved.

In the present invention, the control specifics of the start-up ignition controller are switched in accordance with the detected start-up rotation angle so that when the start-up rotation angle detected by the start-up rotation angle detection means is less than a set angle, there is created a kickback-preventive effect within a range at which engine startability is not compromised, and when the detected start-up rotation angle is equal to or greater than the set angle, there is created a kickback-preventive effect that is greater than the kickback-preventive effect for when the start-up rotation angle is less than the set angle. Therefore, engine ignition is controlled so as to not compromise startability when operation force (kick force in cases in which a kick starter is used) acts on the crankshaft, high start-up torque can be generated, and satisfactory engine startability can be achieved.

Ignition combustion kickback readily occurs during the second compression stroke, which is performed in a state in which the start-up rotation angle is equal to or greater than the set angle and operation force is not being applied from the start-up device to the crankshaft, but in the present invention, the occurrence of kickback can be prevented because engine ignition is controlled so as to increase the kickback-preventive effect at this time. When ignition is controlled so as to increase the kickback-preventive effect during the second compression stroke, the torque generated by combustion weakens but the rotational speed of the crankshaft is increased by the high start-up torque generated by the initial combustion, and the rotational speed can therefore continually be increased even by ignition in the second compression stroke. Consequently, the rotational speed of the engine can be brought to the idling speed with high probability, the probability of completing engine start-up can be increased, and the risk of failure in start-up can be reduced.

The start-up ignition controller can be configured so that the rotational speed of the engine is detected at a position immediately before a start-up regular ignition position which is set to a position angularly advanced relative to a crank angle position at which a piston of the engine reaches top dead center, the ignition position of the engine is the regular ignition position when the detected rotational speed is higher than a preset determination speed, and the ignition position of the engine is angularly delayed by an delaying angle amount commensurate with how low the detected rotational speed is within a range that does not exceed a maximum delay angle position set to a position angularly delayed relative to the regular ignition position when the detected rotational speed is equal to or less than the determination speed.

In this case, the switching means can be configured so as to switch the determination speed in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

The switching means can also be configured so as to switch the start-up regular ignition position and the maximum delay angle position in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

According to the present invention, start-up rotation angle detection means is provided for detecting as a start-up rotation angle a rotation angle of a crankshaft of the engine after initiation of a start-up operation of the engine, and the control specifics of the start-up ignition controller are switched in accordance with the detected start-up rotation angle so that when the start-up rotation angle detected by the start-up rotation angle detection means is less than a set angle, increasing engine startability is prioritized and there is created a kickback-preventive effect within a range at which engine startability is not compromised, and when the detected start-up rotation angle is equal to or greater than the set angle, there is created a kickback-preventive effect that is greater than the kickback-preventive effect for when the start-up rotation angle is less than the set angle. Therefore, engine ignition is controlled so as to not compromise startability when operation force acts on the crankshaft, high start-up torque can be generated, and satisfactory engine startability can be achieved.

According to the present invention, when a state arises in which operation force ceases to be applied on the crankshaft after engine start-up is initiated and kickback readily occurs, engine ignition is controlled so as to increase the kickback-preventive effect, and the occurrence of ignition combustion kickback can therefore be reliably prevented.

BRIEF DESCRIPTION OF THE DRAWINGS

FIG. 8 is a waveform chart showing the waveforms of pulses generated by the crank angle sensor in the second embodiment of the present invention;

DETAILED DESCRIPTION OF THE INVENTION

First Embodiment

Figure 1:
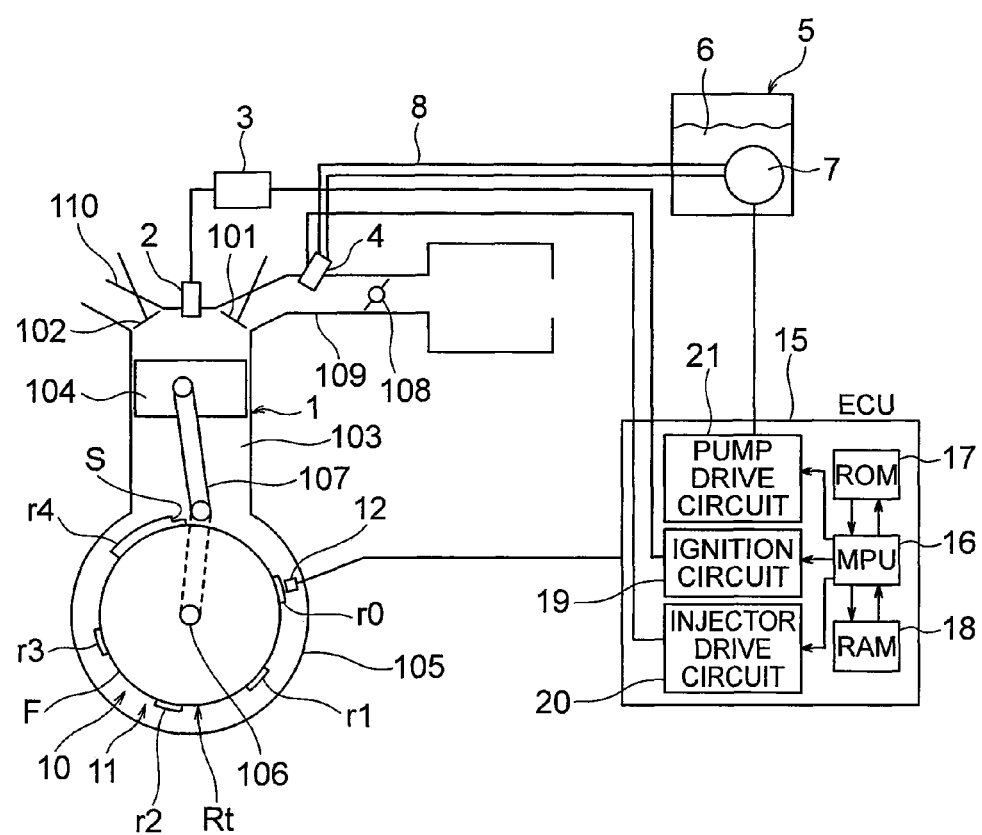
FIG. 1 is a configuration drawing schematically showing the configuration of hardware used in the embodiments of the present invention.

FIG. 1 schematically shows the configuration of hardware used in the embodiments of the present invention, and the numeral 1 in this drawing indicates a single-cylinder four-stroke engine. The engine 1 has a cylinder 103 having in a head an intake port and an exhaust port opened and closed by an intake valve 101 and an exhaust valve 102, a piston 104 disposed inside the cylinder 103, a crank case 105 provided in the bottom part of the cylinder 103, a crankshaft 106 disposed inside the crank case 105 and rotatably supported by the crank case 105, and a connecting rod 107 for linking the crankshaft 106 and the piston 104. A spark plug 2 is attached to the head of the cylinder 103, and a high voltage for ignition induced in a secondary coil of an ignition coil 3 is applied to the spark plug 2. An intake tube 109 having a throttle valve 108 attached inside is connected to the intake port of the engine, and an exhaust tube 110 is connected to the exhaust port. An injector (a fuel injection valve) 4 is attached to the intake tube 109 so as to inject fuel into the intake tube 109 downstream of the throttle valve 108.

In the present embodiment, a kick starter is provided as the start-up device for starting up the engine 1, and rotational force is applied to the crankshaft 106 from the kick starter at engine start-up. In the present invention, an electric start-up device for performing cranking through a starter motor may be provided in addition to a kick starter or other starter operated by human power.

The numeral 5 indicates a fuel tank 5, and fuel 6 accommodated inside the fuel tank 5 is supplied through a fuel pump 7 and a fuel supply pipe 8 to the injector 4. The pressure of the fuel supplied to the injector 4 is kept constant by a pressure regulator (not shown).

In the present embodiment, when the engine is rotating forward, the crankshaft 106 rotates counterclockwise in FIG. 1. Attached to the crankshaft 106 is a rotor 11 of an AC generator 10 composed of a flywheel magnet generator or the like. The rotor 11, as shown, comprises an iron flywheel F formed into the shape of a cup, and the external periphery of the flywheel F is provided with reluctors r0 to r4 composed of multiple arcuate protuberances extending in the circumferential direction of the flywheel. A rotor Rt of a crank angle sensor is configured by the flywheel F and the reluctors r0 to r4.

Figure 2:
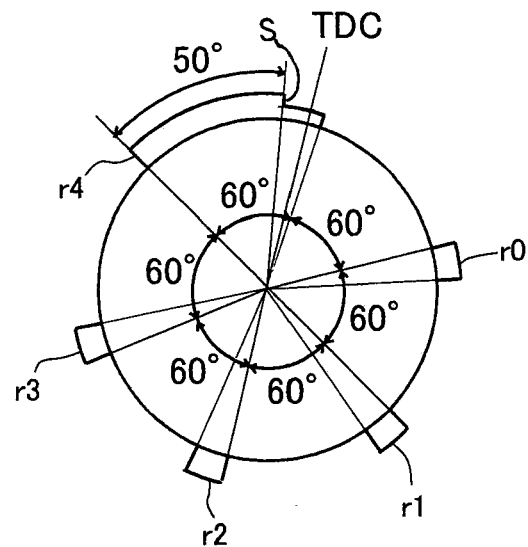
FIG. 2 is a front view showing an example of the configuration of a rotor of a crank angle sensor used in the first embodiment of the present invention.

In the first embodiment of the present invention, of the reluctors r0 to r4, one reluctor r4 is composed of a stepped protuberance having a level difference S at some point in the circumferential direction, and the other four reluctors r0 to r3 are composed of protuberances having no level difference at any point. The arc angle between the poles of the stepped reluctor r4 is 60°, and the angles between the reluctor r4 and the adjacent reluctors r0 and r3 and the angles between each of the reluctors r0 to r3 are also 60°, as shown in FIG. 2. In the present embodiment, the arc angle between the poles between the front end edge of the reluctor r4 in the rotational direction and the level difference S is 50°.

Disposed in the external peripheral side of the rotor Rt is a crank angle sensor 12 for detecting the front end edges and rear end edges of the reluctors r0 to r4 in the rotational direction as well as the level difference S of the reluctor r4, and generating a pulse. The crank angle sensor 12 is a conventional sensor which has an iron core having a magnetic pole part facing the reluctors, a signal coil wound around the iron core, and a permanent magnet coupled with the iron core. When the edges of the reluctors r0 to r4 and the level difference part of the reluctor r4 pass through the position of the magnetic pole part of the iron core, a crank angle signal of a pulse waveform is induced in the signal coil by a change occurring in a magnetic flux interlinked with the signal coil.

Figure 3:
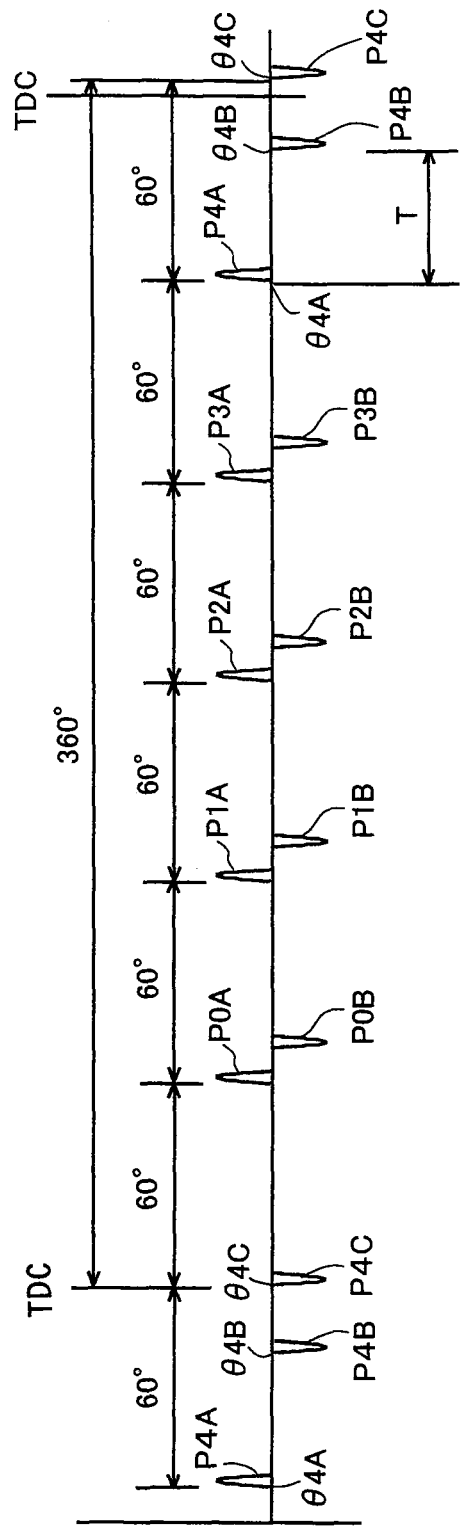
FIG. 3 is a waveform chart showing the waveforms of pulses generated by the crank angle sensor in the first embodiment of the present invention.
Figure 4:
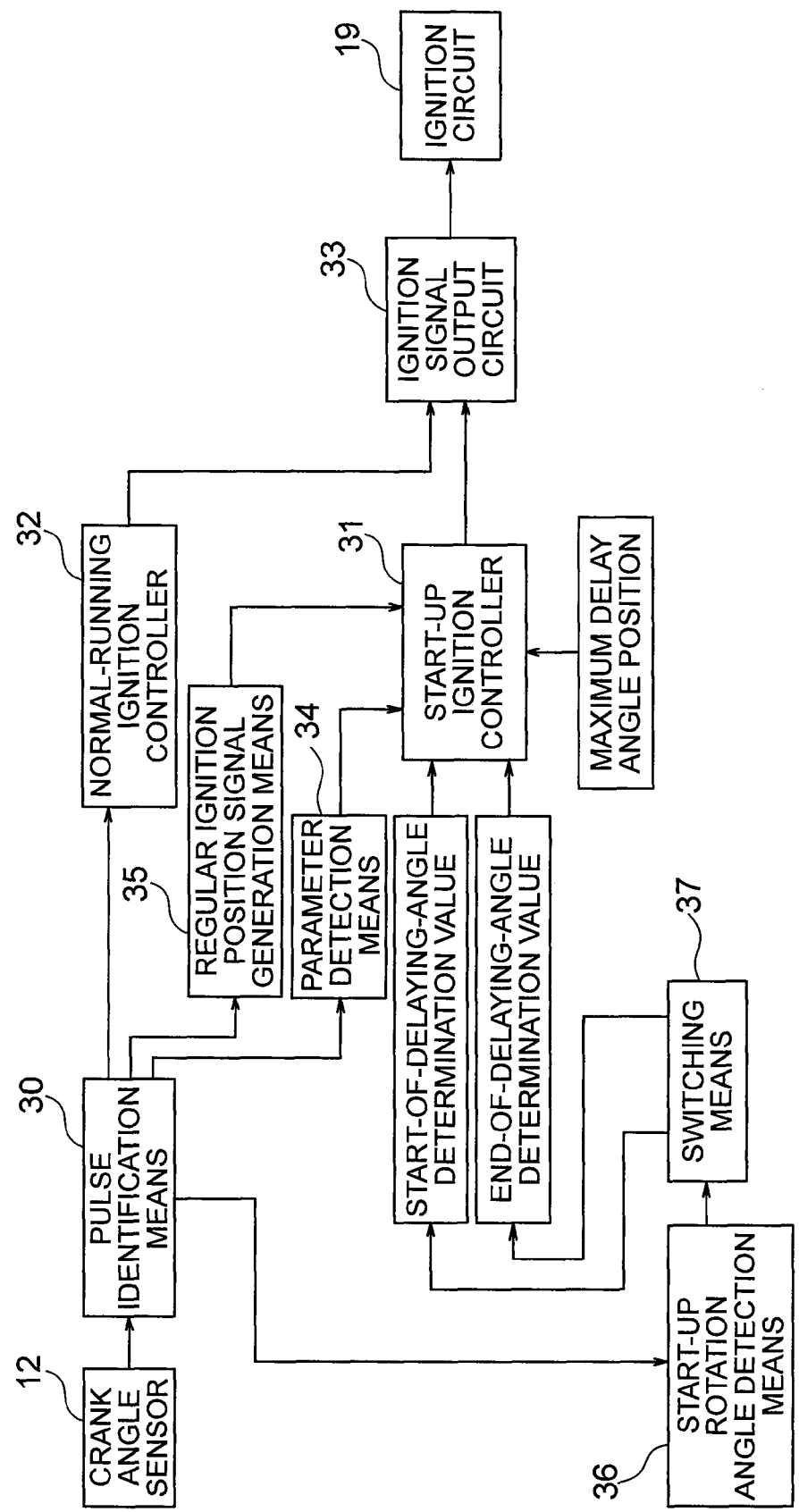
FIG. 4 is a block diagram showing the configuration of the first embodiment of the present invention.

Referring to FIG. 3, in the present embodiment, pulses are shown in relation to rotational angles of the crankshaft (crank angles), the pulses being generated as crank angle signals by the crank angle sensor 12 when the engine 1 is rotating forward. Of the series of pulses shown in FIG. 3, the pulses P0A to P3A indicate pulses of one polarity generated when the crank angle sensor 12 detects the front end edges of the reluctors r01 to r03 in the rotational direction when the engine is rotating forward, and the pulses P0B to P3B indicate pulses of the other polarity generated when the crank angle sensor 12 detects the rear end edges of the reluctors r01 to r03 in the rotational direction when the engine is rotating forward. The pulse P4A indicates a pulse of one polarity generated when the crank angle sensor 12 detects the front end edge of the reluctor r4 in the rotational direction when the engine is rotating forward, and the pulses P4B and P4C indicate pulses of the other polarity generated when the crank angle sensor detects the level difference S and the rear end edge in the rotational direction of the reluctor r4 when the engine is rotating forward. In the example shown, the pulses P0A to P4A are pulses of positive polarity, and the pulses P0B to P4B and P4C are pulses of negative polarity. In FIG. 4, TDC indicates the crank angle position when the piston of the engine reaches top dead center.

In the present specification, the position of $\theta 4A$ is a first reference crank angle position set to a position sufficiently angularly advanced relative to the crank angle position equivalent to top dead center of the piston of the engine, and the pulse P4A generated at this first reference crank angle position is a first reference pulse. A crank angle position $\theta 4B$, which is set to a position delayed relative to the generated position $\theta 4A$ of the first reference pulse and advanced relative to the crank angle position TDC equivalent to top dead center of the piston of the engine, is a second reference crank angle position, and the pulse P4B generated at this second reference crank angle position is a second reference pulse. Furthermore, the crank angle position $\theta 4C$, which is delayed relative to the crank angle position TDC equivalent to top dead center, is a third reference crank angle position, and the pulse P4C generated by this third reference crank angle position $\theta 4C$ is a third reference pulse.

Specifically, the crank angle sensor 12 used in the present embodiment is configured so as to generate the first reference pulse P4A at the first reference crank angle position $\theta 4A$ set to a position angularly advanced relative to the crank angle position TDC equivalent to top dead center of the piston of the engine, the second reference pulse P4B at the second reference crank angle position θ4B set to a position delayed relative to the generated position of the first reference pulse and advanced relative to the crank angle position TDC equivalent to top dead center of the piston of the engine, the third reference pulse P4C at the third reference crank angle position θ4C delayed relative to the crank angle position TDC equivalent to top dead center, and also a plurality of pulses P0A, P0B, P1A, P1B, ..., P3B in the sections between the third reference crank angle position θ4C and the first reference crank angle position θ4A.

In FIG. 1, the numeral 15 indicates an electronic control unit (ECU). Inside the ECU 15 is provided a microprocessor MPU 16, ROM 17, and RAM 18, as well as an ignition circuit 19 for controlling electric current flowing to a primary coil of the ignition coil 3, an injector drive circuit 20 for driving the injector 4, and a pump drive circuit 21 for driving the pump 7. The ignition circuit 19 is a circuit for causing a steep change in the primary electric current of the ignition coil 3 and inducing a high voltage for ignition in the secondary coil of the ignition coil 3 when an ignition signal is sent from the MPU 16, and an ignition device for igniting the engine 1 is configured by the ignition coil 3 and the ignition circuit 19. The ignition position of the engine (the crank angle position at which engine ignition is performed) is decided by the position at which the ignition signal is sent from the MPU 16 to the ignition circuit 19.

Known circuits that could be used as the ignition circuit 19 include capacitor discharge circuits and current interruption circuits, but the ignition device of the engine in which the present invention is applied may be any type of device as long as it performs an ignition action in response to an ignition signal. In the present embodiment, the ignition circuit 19 is a capacitor discharge circuit comprising a capacitor recharged to one polarity at a position whose phase is advanced relative to the ignition position, and a discharge switch which turns on upon receiving an ignition signal and discharges the electrical charge stored in the capacitor to the primary coil of the ignition coil 3.

The injector drive circuit 20 causes an electric current to flow to a solenoid coil of the injector 4 and opens a valve of the injector 4 when an injection command signal is sent from the MPU 16. The injector 4 injects fuel into the intake tube 109 while the valve is open. The amount of fuel injected by the injector 4 is decided by the pressure of the fuel sent from the fuel pump 7 to the injector 4 and the time during which the injector 4 is open (the valve-open time). In the present embodiment, since the pressure of the fuel sent to the injector 4 is kept constant, the amount of fuel injected is managed according to the valve-open time of the injector 4.

The MPU 16 constitutes various function blocks (function implementation means) needed in order to carry out the present invention by executing a program stored in the ROM 17. FIG. 4 shows the configuration of the first embodiment of the present invention which includes function blocks configured by causing the MPU to carry out a predetermined program.

In FIG. 4, the numeral 30 indicates pulse identification means for identifying the pulse generated by the crank angle sensor 12. After the crank angle sensor 12 detects the reluctor r4 and detects the pulses P4B and P4C then generated with the same polarity, the pulse identification means 30 recognizes that the pulse detected first is the pulse P0A generated at the crank angle position θ0A that corresponds to the front end edge of the reluctor r0, assigns a leading number to this pulse, and assigns consecutive numbers to the pulses sequentially generated thereafter, thereby identifying the pulses P0B, P1A, P1B, P2A, P2B, ..., P4A generated respectively at the crank angle positions θ0B, θ1A, θ1B, θ2A, θ2B, ..., θ4A. The MPU obtains the crank angle information and the information of the rotational speed of the engine from these pulses.

In the present embodiment, the generated position (the second reference crank angle position) θ4B of the second reference pulse P4B is the regular ignition position at start-up. This regular ignition position is a position angularly advanced by a certain angle relative to the crank angle position at which the piston of the engine reaches top dead center of the compression stroke (referred to as "top dead center"). Moreover, when an operator having an average kick force performs the start-up operation and the rotational speed of the crankshaft is within an estimated fluctuating range when the piston of the engine acts as though to surpass top dead center of the compression stroke while rotational force (kick force) is being applied to the crank shaft from the start-up device, the regular ignition position is set to a position at which no kickback is caused and which is suitable in order to generate sufficiently high start-up torque from the engine.

In the present embodiment, the third reference crank angle position θ4C at which the third reference pulse P4C is generated is set to an ignition position (the maximum delay angle position) which, of all the ignition positions delayed relative to the regular ignition position θ4B, is the maximally delayed of the positions that can be selected in order to suppress the occurrence of kickback when the state is such that no rotational force is being applied to the crankshaft from the start-up device.

The MPU detects each of the ignition positions with reference to the first reference crank angle position set in a position sufficiently angularly advanced relative to the crank angle position at which the piston of the engine reaches top dead center. In this case, the MPU calculates each of the ignition positions of the engine in relation to the rotational speed, the throttle valve opening degree, or another predetermined control condition, with the formats of times measured by a timer, while the crankshaft is rotating from the first reference crank angle position to the ignition positions (measured times for ignition position detection). The MPU sets the calculated measured time to the timer and initiates measurement thereof when the first reference pulse P4A is generated, and when the measurement is complete, the MPU generates an ignition command signal.

The MPU also detects the rotational speed of the engine from the intervals at which the crank angle sensor 12 generates pulses. In the present embodiment, the average rotational speed of the engine is found from the interval in which the first reference pulse P4A is generated (the time needed for the crankshaft to rotate 360°), and this average rotational speed is used as a control condition to calculate the ignition position of the engine during normal running. At engine start-up, a time T, which is the time from the generation of the first reference pulse P4A until the generation of the second reference pulse P4B which indicates the regular ignition position at start-up, is set as a parameter for obtaining rotational speed information immediately before the regular ignition position at engine start-up, and the rotational speed information immediately before the regular ignition position at engine start up is obtained from this parameter T to control ignition. The parameter T assumes a value inversely proportional to the engine rotating speed immediately before the regular ignition position θ4B.

The engine ignition control device according to the present embodiment is provided with a start-up ignition controller 31 for controlling ignition at engine start-up, a normal-running ignition controller 32 for controlling ignition during normal running after engine start-up is complete, and an ignition signal output circuit 33 for sending an ignition signal to the ignition circuit 19 when the ignition controller 31 or 32 generates an ignition command.

The normal-running ignition controller 32 is a function block for controlling ignition during normal running after engine start-up is complete, and the normal-running ignition controller 32 is configured from an ignition position calculator for obtaining rotational speed of the engine information from the pulse identified by the pulse identification means 30 and calculating the ignition positions in the rotational speed of the engines, and an ignition command generation unit for setting in the timer a measurement value for detecting the ignition position calculated when the reference crank angle position θ4A is detected, initiating the measurement thereof, and sending an ignition command to the ignition signal output circuit 33 when the timer has completed measurement of the set measurement value. In the ignition control device according to the present invention, the configuration of the normal-running ignition controller 32 may be the same as conventional ignition controllers, and a detailed description is therefore omitted.

In the present embodiment, parameter detection means 34 is provided for detecting the time T as a rotational speed detection parameter including information of the rotational speed of the engine immediately before the regular ignition position, the time T being required for the crankshaft to rotate through a certain crank angle section immediately before the regular ignition position at engine start-up (the section from θ4A to θ4B in the present embodiment), and the rotational speed information immediately before the regular ignition position is obtained from the parameter T detected by the parameter detection means 34.

The parameter detection means 34 is configured, for example, so as to calculate the time T from the timer measurement value at the timing at which the pulse P4A is read in the MPU and the timer measurement value at the timing at which the pulse P4B is read in the MPU, and to send the calculated time T as a parameter to the start-up ignition controller 31. When the value of the parameter T is equal to or greater than a determination value set in advance, the start-up ignition controller 31 determines that the rotational speed of the engine immediately before the regular ignition position is equal to or less than a determination speed.

In the present embodiment, regular ignition position signal generation means 35 is also provided for detecting that the crank angle position of the engine is in the regular ignition position θ4B at start-up and generating a regular ignition position signal S4B when the pulse P4B is identified to have been generated by the pulse identification means 30. The regular ignition position signal generated by the regular ignition position signal generation means 35 is sent to the start-up ignition controller 31 together with the parameter T detected by the parameter detection means 34.

The start-up ignition controller 31 is a function block for controlling ignition at engine start-up. The basis of the start-up ignition controller 31 is that it controls the ignition position at start-up so as to generate as high a start-up torque as possible at engine start-up, but when conditions are detected such that there is a risk of kickback occurring at engine start-up, the occurrence of kickback is prevented either by delaying the engine ignition position or by stopping ignition.

The start-up ignition controller 31 of the present embodiment is configured so as to detect the rotational speed of the engine at a position immediately before the regular ignition position θ4B at start-up set to a position angularly advanced relative to the crank angle position TDC at which the piston of the engine reaches top dead center, set the engine ignition position to the regular ignition position θ4B when the detected rotational speed is higher than the preset determination speed (when the parameter T is smaller than the determination value), and angularly delay the engine ignition position by an delaying angle amount commensurate with how low the detected rotational speed is within a range that does not exceed the maximum delay angle position θ4C set to a position angularly delayed relative to the regular ignition position when the detected rotational speed is equal to or less than the determination speed (when the parameter T is equal to or greater than the determination value).

Because the start-up ignition controller 31 performs the above control, in the present embodiment, a start-of-delaying-angle determination value is prepared as a determination value to be compared with the parameter T in order to determine whether or not the rotational speed of the engine immediately before the regular ignition position at start-up is the rotational speed at which delaying of the ignition position is initiated. An end-of-delaying-angle determination value is prepared as a determination value to be compared with the parameter T in order to determine whether or not the rotational speed of the engine immediately before the regular ignition position at start-up is the rotational speed at which the ignition position is the maximum delay angle position. The maximum delay angle position is set as the maximally delayed ignition position that can be selected at engine start-up. The start-up ignition controller 31 is configured so as to ignite the engine at the regular ignition position θ4B when the parameter T is less than the preset start-of-delaying-angle determination value, to ignite the engine at an ignition position delayed relative to the regular ignition position θ4B by an delaying angle amount commensurate with the magnitude of the parameter T when the parameter T is in a range between the start-of-delaying-angle determination value and the set end-of-delaying-angle determination value, inclusive (greater than the start-of-delaying-angle determination value), and to set the ignition position to the maximum delay angle position when the parameter T has reached the end-of-delaying-angle determination value.

In the present invention, kickback does not readily occur while rotational force is being applied from the start-up device to the crankshaft at engine start-up, but focusing on the fact that kickback occurs readily when rotational force is no longer being applied from the start-up device to the crankshaft, the control specifics of the start-up ignition controller are switched depending on whether or not rotational force is being applied from the start-up device to the crankshaft. By switching the control specifics of the start-up ignition controller in this manner, engine ignition is controlled so as to obtain a kickback-preventing effect while giving priority to ensuring engine startability while rotational force is being applied from the start-up device to the crankshaft, and when rotational force is no longer being applied from the start-up device to the crankshaft, the engine ignition is controlled so as to produce a great kickback-preventing effect.

To enable the above control, in the present invention, there are provided start-up rotation angle detection means 36 for detecting as a start-up rotation angle the rotation angle of the crankshaft of the engine from the time the engine start-up operation is initiated, and switching means 37 for switching the start-of-delaying-angle determination value and the end-of-delaying-angle determination value when the rotation angle detected by the rotation angle detection means has reached a set angle in each of the regular ignition positions.

The set angle is set to be virtually equal to the angle at which rotational force is applied from the start-up device to the crankshaft at engine start-up. In cases in which a kick starter is used, it is adequate to set the set angle to 540°. When the set angle is set as such, a state of rotational force being applied from the start-up device to the crankshaft can be determined when the start-up rotation angle is less than the set angle, and a state of rotational force not being applied from the start-up device to the crankshaft can be determined when the start-up rotation angle is equal to or greater than the set angle.

The start-up rotation angle detection means 36 used in the present embodiment detects the start-up rotation angle of the crankshaft in 60° units by counting the pulses P4A, P4C, P0A, P1A, P2A, and P3A generated at 60° intervals among the pulses identified by the pulse identification means 30, and switches the start-of-delaying-angle determination value and the end-of-delaying-angle determination value when the detected start-up rotation angle reaches the set angle (540°).

There are various possibilities for the method for switching the start-of-delaying-angle determination value and the end-of-delaying-angle determination value, but in the present embodiment, a first start-of-delaying-angle determination speed used when rotational force is being applied from the start-up device of the engine to the crankshaft and a second start-of-delaying-angle determination speed (greater than the first start-of-delaying-angle determination speed) used when rotational force is no longer being applied from the start-up device to the crankshaft are prepared as start-of-delaying-angle determination speeds to be compared with a rotational speed detected at a position immediately before the regular ignition position in order to determine whether or not to initiate delaying of the ignition position. During a state of rotational force being applied from the start-up device to the crankshaft, control is performed for delaying angle of the ignition position relative to the regular ignition position by an delaying angle amount that matches the decrease in rotational speed when the rotational speed detected in a position immediately before the regular ignition position is equal to or less than the first start-of-delaying-angle determination speed, and during a state of rotational force no longer being applied from the start-up device to the crankshaft, control is performed for delaying angle of the ignition position relative to the regular ignition position by an delaying angle amount that matches the extent of the decrease in rotational speed when the rotational speed detected in a position immediately before the regular ignition position is equal to or less than the second start-of-delaying-angle determination speed.

A first end-of-delaying-angle determination speed used when rotational force is being applied from the start-up device of the engine to the crankshaft and a second end-of-delaying-angle determination speed (greater than the first end-of-delaying-angle determination speed) used when rotational force is no longer being applied from the start-up device to the crankshaft are also prepared as end-of-delaying-angle determination speeds to be compared with the rotational speed detected at a position immediately before the regular ignition position in order to determine whether or not to use the ignition position as the maximum delay angle position. In a state of rotational force being applied from the start-up device to the crankshaft, the ignition position is used as the maximum delay angle position when the rotational speed detected at a position immediately before the regular ignition position is equal to or less than the first end-of-delaying-angle determination speed, and in a state of rotational force no longer being applied from the start-up device to the crankshaft, the ignition position is used as the maximum delay angle position when the rotational speed detected at a position immediately before the regular ignition position is equal to or less than the second end-of-delaying-angle determination speed.

As previously described, in the present embodiment, the time T required for the engine to rotate through a certain section immediately before the regular ignition position is used as a parameter (a variable) for detecting the rotational speed, whether or not to angularly delay the ignition position past the regular ignition position is determined by comparing the parameter T with the start-of-delaying-angle determination value, and whether or not to use the ignition position as the maximum delay angle position is determined by comparing the parameter T with the end-of-delaying-angle determination value.

Figure 5:
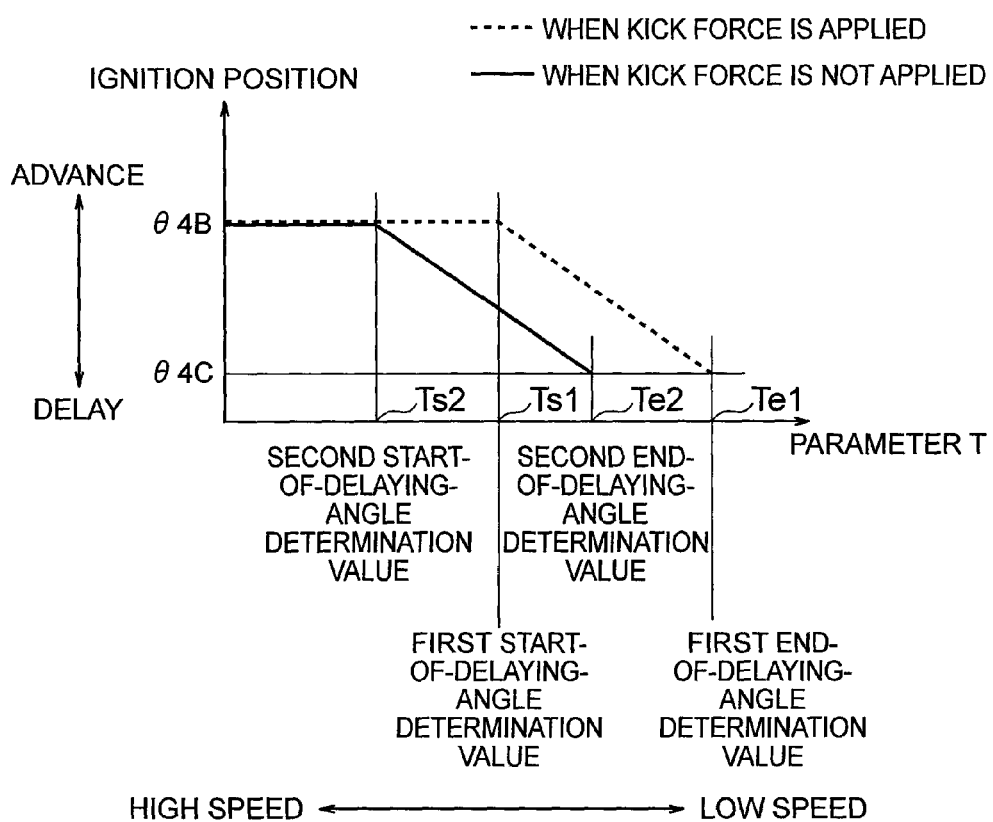
FIG. 5 is a graph showing the relationship between the ignition position and the rotational speed detection parameter in the ignition control device according to the first embodiment of the present invention.

Referring to FIG. 5, the relationship between the ignition position at start-up and the parameter T in the present embodiment is shown in the form of a graph. In this graph, the crooked dashed line shows the relationship between the ignition position and the parameter T when kick force is applied, and the crooked solid line shows the relationship between the ignition position and the parameter T when kick force is not applied. In this example, a first start-of-delaying-angle determination value Ts1 used when rotational force is being applied from the start-up device of the engine to the crankshaft and a second start-of-delaying-angle determination value Ts2 (less than the first start-of-delaying-angle determination value) used when rotational force is no longer being applied from the start-up device to the crankshaft are prepared as start-of-delaying-angle determination values to be compared with the parameter T detected at a position immediately before the regular ignition position in order to determine whether or not to angularly delay the ignition position past the regular ignition position. During a state of rotational force being applied from the start-up device to the crankshaft, control is performed for delaying angle of the ignition position relative to the regular ignition position θ4B by an delaying angle amount that matches the extent of increase in the parameter T when the parameter detected in a position immediately before the regular ignition position is equal to or greater than the first start-of-delaying-angle determination value Ts1, and during a state of rotational force no longer being applied from the start-up device to the crankshaft, control is performed for delaying angle of the ignition position relative to the regular ignition position θ4B by an delaying angle amount that matches the extent of the increase in the parameter T when the parameter detected in a position immediately before the regular ignition position is equal to or less than the second start-of-delaying-angle determination value Ts2.

A first end-of-delaying-angle determination value Te1 used when rotational force is being applied from the start-up device of the engine to the crankshaft and a second end-of-delaying-angle determination value Te2 (less than the first end-of-delaying-angle determination value) used when rotational force is no longer being applied from the start-up device to the crankshaft are prepared as end-of-delaying-angle determination values to be compared with the parameter T detected at a position immediately before the regular ignition position in order to determine whether or not to use the ignition position as the maximum delay angle position. During a state of rotational force being applied from the start-up device to the crankshaft, the ignition position is used as the maximum delay angle position θ4C when the parameter T detected at a position immediately before the regular ignition position is equal to or greater than the first end-of-delaying-angle determination value Te1, and during a state of rotational force no longer being applied from the start-up device to the crankshaft, the ignition position is used as the maximum delay angle position θ4C when the parameter T detected at a position immediately before the regular ignition position is equal to or greater than the second end-of-delaying-angle determination value Te2.

Figure 6:
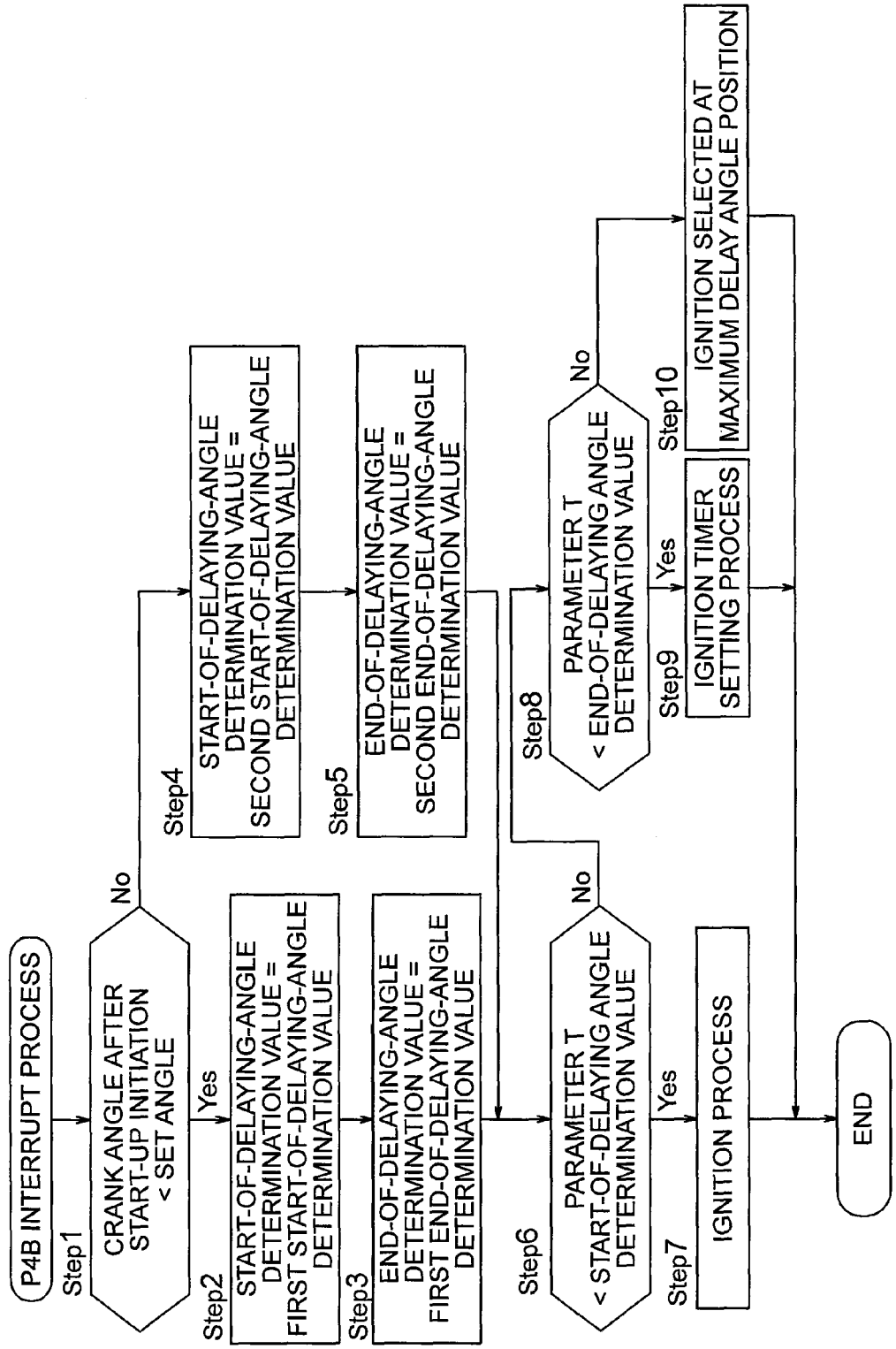
FIG. 6 is a flowchart showing an example of an algorithm of the program executed by a microprocessor in order to realize each of the parts of FIG. 4 in the first embodiment of the present invention.

Referring to FIG. 6, a flowchart shows an example of an algorithm of an interrupt process executed by the MPU in order to configure the switching means 37 and the start-up ignition controller 31 shown in FIG. 4. The interrupt process of FIG. 6 is a process executed every time the crank angle sensor 12 generates a second reference pulse P4B. In cases in which this algorithm is used, a determination is made as to whether or not the start-up rotation angle, which is the rotation angle of the crankshaft after start-up initiation in step 1, is less than the set angle (540°). As a result, when the start-up rotation angle is less than the set angle, the process proceeds to step 2 where the first start-of-delaying-angle determination value Ts1 is set as the start-of-delaying-angle determination value, and in step 3, the first end-of-delaying-angle determination value Te1 is set as the end-of-delaying-angle determination value to be used in the determination. When the start-up rotation angle is determined to be equal to or greater than the set angle in step 1, the process proceeds to step 4 where the second start-of-delaying-angle determination value Ts2 is set as the start-of-delaying-angle determination value to be used in the determination, and in step 5, the second end-of-delaying-angle determination value Te2 is set as the end-of-delaying-angle determination value to be used in the determination. In this example, the switching means 37 is configured by steps 1 through 5.

After step 3 or step 5 has been executed, step 6 is executed, and a determination is made as to whether or not the parameter T detected at the regular ignition position θ4B at start-up is less than the set start-of-delaying-angle determination value. As a result, when the parameter T is less than the start-of-delaying-angle determination value (when the rotational speed of the engine exceeds the start-of-delaying-angle determination speed), the process proceeds to step 7 and an ignition process is performed immediately (in the regular ignition position θ4B) for sending an ignition command to the ignition signal output circuit 33. When it is determined in step 6 that the parameter T is equal to or greater than the start-of-delaying-angle determination value (that the rotational speed of the engine is equal to or less than the start-of-delaying-angle determination speed), the process proceeds to step 8 and a determination is made as to whether or not the parameter T is less than the set end-of-delaying-angle determination value. As a result, when the parameter T is determined to be less than the end-of-delaying-angle determination value, the process proceeds to step 9, and a process is performed for setting a measured value for ignition position detection that matches the magnitude of the parameter T in the ignition timer. The measured value for ignition position detection in this case is the time required for the engine to rotate from the regular ignition position θ4B to the angularly delayed ignition position, and is mapped according to the value of the parameter T. In this case, an ignition command is sent to the ignition signal output circuit and an ignition signal is sent to the ignition circuit 19 when the ignition timer has completed measurement of the measured value. When it is determined in step 8 that the parameter T is equal to or greater than the end-of-delaying-angle determination value (that the rotational speed is equal to or less than the end-of-delaying-angle determination speed), the process proceeds to step 10 and a process is performed for sending an ignition command to the ignition signal output circuit 33 at the maximum delay angle position. In cases using the algorithm of FIG. 6, the start-up ignition controller 31 is configured by steps 6 through 10.

Figure 13:
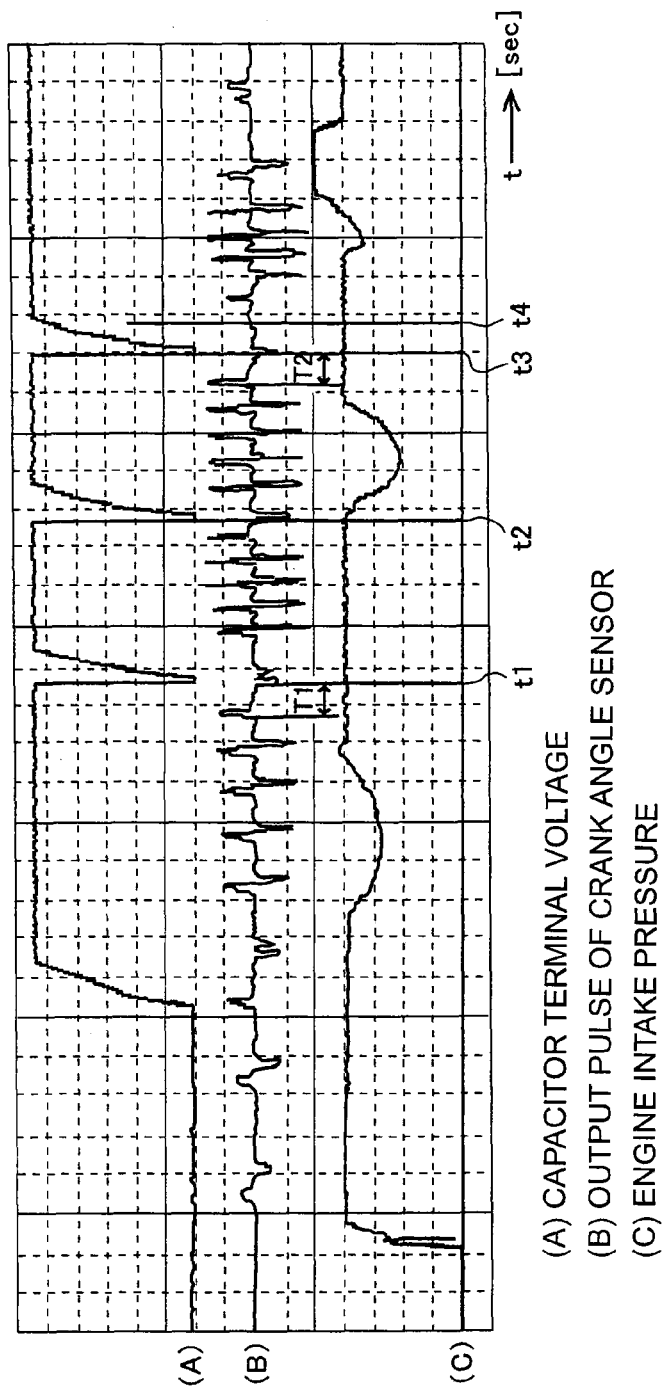
FIG. 13 is a diagram showing the waveform of terminal voltage of a capacitor when kickback occurs, the waveform of the output pulse of the crank angle sensor, and the change in engine intake pressure, relative to time, in a four-stroke engine ignited by a capacitor-discharge ignition device.

In the ignition control device of the present embodiment, when an experiment was performed repeatedly for starting up an engine while the ignition position at start-up was fixed in the regular ignition position set with priority to improving startability, it was clear that there were few occurrences of kickback in the initial compression stroke performed when the start-up rotation angle was less than the set angle (when kick force was applied to the crankshaft), but kickback occurred frequently in the second compression stroke performed while the start-up rotation angle was equal to or greater than the set angle. FIG. 13 shows the terminal voltage of the ignition capacitor in the ignition circuit 19, the pulse waveform outputted by the crank angle sensor, and the change in the internal pressure (negative pressure) of the intake tube of the engine, observed when the operation for starting up the engine was performed while the ignition position at start-up was fixed in the regular ignition position set with priority to improving startability, in relation to time t. In this example, the ignition circuit 19 discharges the electric charge stored in the ignition capacitor and performs the ignition action at timings t1, t2, and t3. Ignition just short of top dead center of the initial compression stroke is performed at timing t1, and ignition just short of top dead center of the second compression stroke is performed at timing t3. Ignition at timing 2 is performed just short of top dead center of the exhaust step, and the spark generated by this ignition is an ineffectual flame. In this example, a parameter T1 detected at the regular ignition position in the initial compression stroke was less than the start-of-delaying-angle determination value, and kickback therefore did not occur even though ignition was performed at the regular ignition position. In the second compression stroke, a parameter T2 detected at the regular ignition position far exceeded the end-of-delaying-angle determination value; therefore, kickback occurred and the engine rotated in reverse at timing t4.

When the ignition position at start-up is constant, the ignition position at start-up must be set to a position angularly delayed relative to the ignition position θ4B at which startability can be improved in order to prevent kickback from occurring at ignition in the second compression stroke as shown in FIG. 13, but when the ignition position at start-up is set as such, it is sometimes not possible for high start-up torque to be generated by the ignition at timing t1 performed first after start-up initiation. Therefore, there are instances in which the number of engine rotations cannot be increased to the number of idling rotations even by the second ignition, and engine start-up fails.

In contrast, when the start-of-delaying-angle determination value and the end-of-delaying-angle determination value are switched between a state of rotational force being applied from the start-up device to the crankshaft and a state of rotational force no longer being applied from the start-up device to the crankshaft as in the present invention, after the start-up operation is initiated: during the initial compression stroke performed while rotational force is being applied from the start-up device to the crankshaft, ignition can be performed in an angularly advanced ignition position θ4B that is suitable for ensuring startability among the ignition positions that can be selected at start-up; and during the second compression stroke performed in a state of rotational force no longer being applied from the start-up device to the crankshaft (the probability of kickback occurring is high), ignition can be performed in an angularly delayed ignition position that is suitable for preventing kickback. Therefore, the occurrence of kickback can be reliably prevented while engine startability is ensured.

Figure 14:
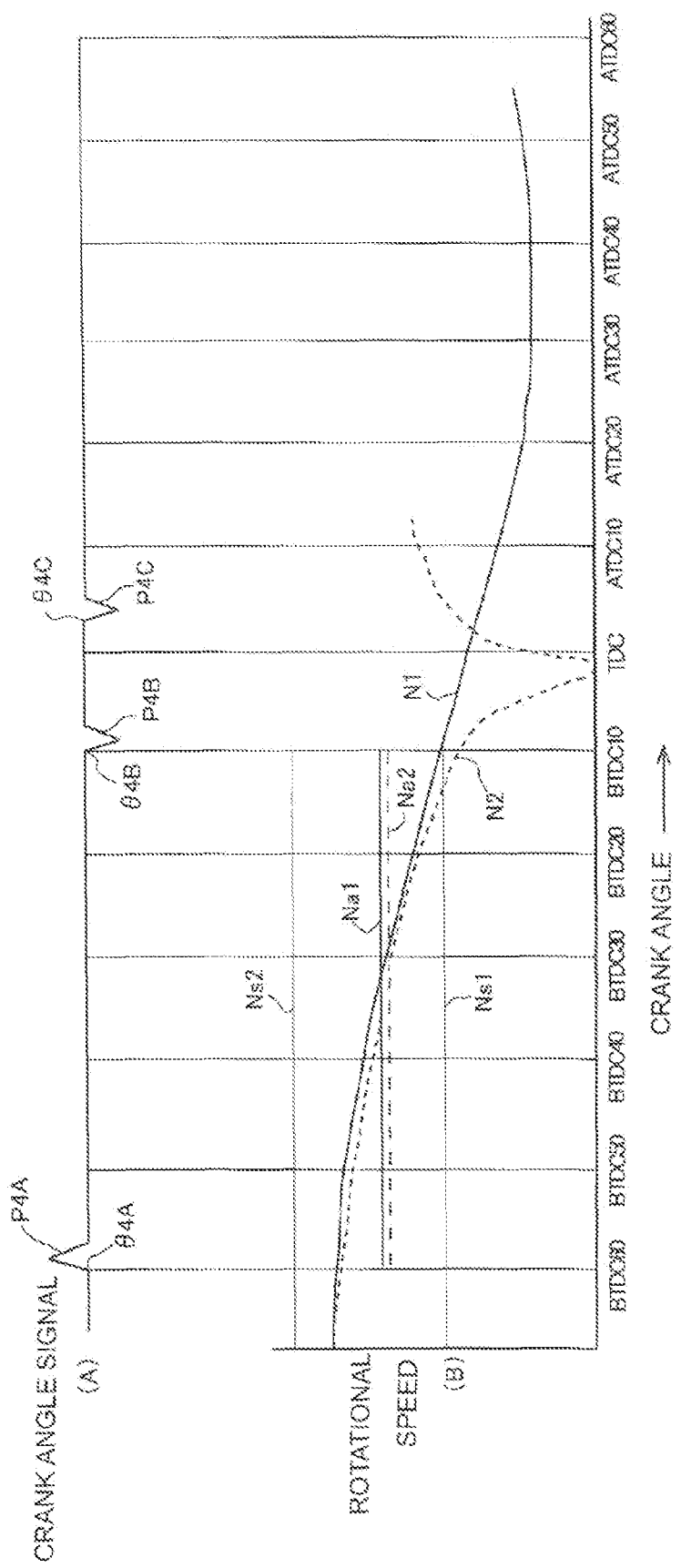
FIG. 14 is a diagram for describing the action of an engine in which ignition is controlled by the ignition control device according to the present invention.

FIG. 14 shows an example of the transition of the rotational speed of the engine in a case in which the rotational speed detected immediately before the regular ignition position at start-up in the first compression stroke and the rotational speed detected immediately before the regular ignition position in the second compression stroke are virtually equal. (A) indicates the crank angle signal and (B) indicates the rotational speed of the engine relative to the crank angle. In FIG. 14(B), Na1 is the rotational speed measured between the first reference crank angle position θ4A and the second reference crank angle position (the regular ignition position at start-up) θ4B in the first compression stroke performed while kick force is being applied to the crankshaft, and Na2 is the rotational speed measured between the first reference crank angle position θ4A and the second reference crank angle position (the regular ignition position at start-up) θ4B in the second compression stroke performed while kick force is not being applied to the crankshaft. Ns1 is the first start-of-delaying-angle rotational speed set in the first compression stroke, and Ns2 is the second start-of-delaying-angle rotational speed set in the second compression stroke. N1 indicates the rotational speed at each instant in the first compression stroke, and N2 indicates the instantaneous rotational speed in the second compression stroke.

In the example shown in FIG. 14, the rotational speeds Na1 and Na2 detected immediately before the regular ignition position are virtually equal in both the first compression stroke and the second compression stroke. In such a state, problems such as those shown below occur in cases in which the start-of-delaying-angle determination speed is set to be the same in both the first compression stroke and the second compression stroke. In cases in which the start-of-delaying-angle determination speed is set to Ns1 in both the first compression stroke and the second compression stroke, for example, ignition is performed at the regular ignition position θ4B in both the first compression stroke and the second compression stroke, and kickback therefore sometimes occurs as in N2 of the drawing in the second compression stroke. In cases in which the start-of-delaying-angle determination speed is set to Ns2 in both the first compression stroke and the second compression stroke, the ignition position is delayed relative to the regular ignition position in the first compression stroke; therefore, great start-up torque cannot be generated, and there is a risk of failure in the engine start-up. In the present invention, since ignition can be performed at the regular ignition position θ4B with the start-of-delaying-angle determination speed at Ns1 in the first compression stroke and ignition can be performed at a position delayed relative to the regular ignition position with the start-of-delaying-angle determination speed at Ns2 in the second compression stroke, startability can be improved and the occurrence of kickback can be prevented.

Second Embodiment

Figure 7:
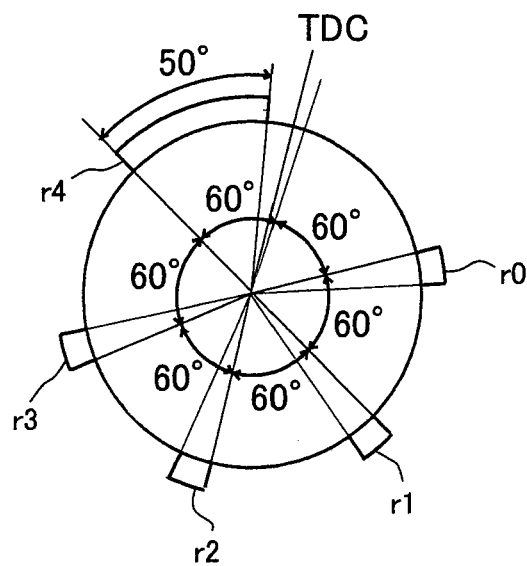
FIG. 7 is a front view showing an example of the configuration of a rotor of a crank angle sensor used in the second embodiment of the present invention.

In the first embodiment, a protuberance having a level difference at some point was used as the reluctor r4 for generating a reference pulse, but in the present embodiment, a reluctor r4 composed of an arcuate protuberance having no level difference at any point is used as shown in FIG. 7. In this case, the arc angle between the poles of the reluctor r4 is made equal to the angle (50° in the present embodiment) from the first reference crank angle position θ4A to the second reference crank angle position θ4B. FIG. 8 shows the waveform of the crank angle signal outputted by the crank angle sensor 12 when such a reluctor is provided. The crank angle signal shown in FIG. 8 has a waveform that omits the pulse P4C from the waveform shown in FIG. 3.

Figure 9:
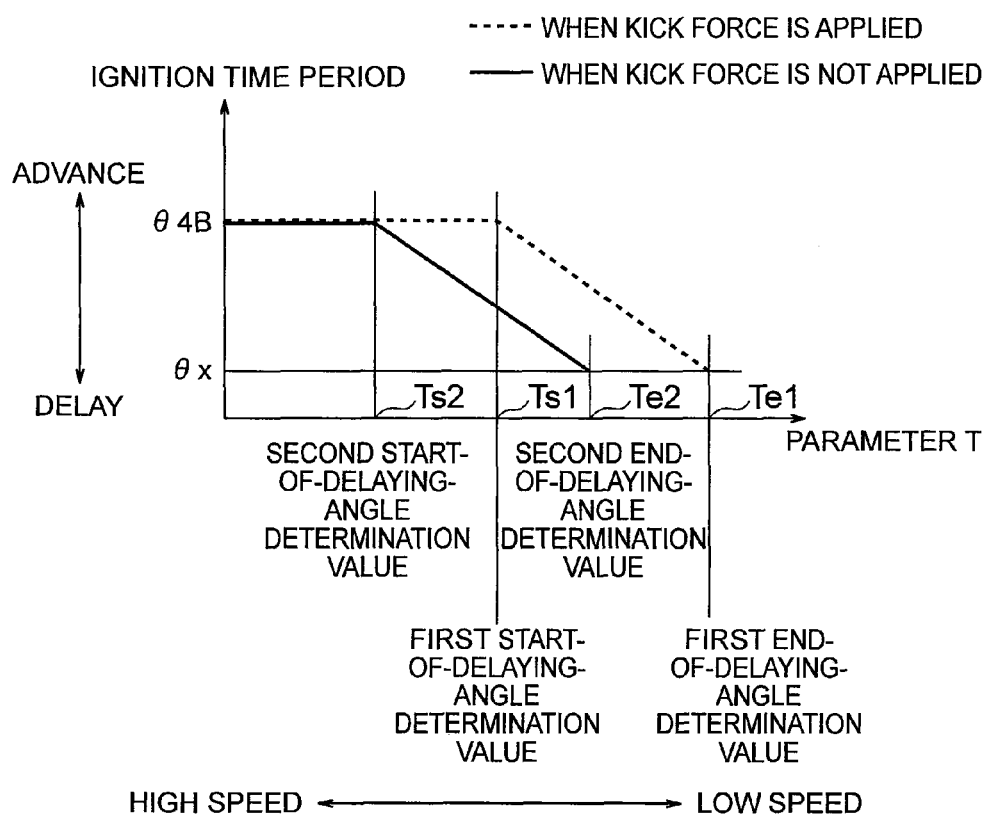
FIG. 9 is a graph showing the relationship between the ignition position and the rotational speed detection parameter in the ignition control device according to the second embodiment of the present invention.

In cases in which a crank angle signal such as the one shown in FIG. 8 is used, a first start-of-delaying-angle determination value Ts1 used when kick force is applied to the crankshaft and a second start-of-delaying-angle determination value Ts2 used when kick force is not applied to the crankshaft are prepared as start-of-delaying-angle determination values to be compared with the parameter T, and a first end-of-delaying-angle determination value Te1 used when kick force is applied to the crankshaft and a second end-of-delaying-angle determination value Te2 used when kick force is not applied to the crankshaft are prepared as end-of-delaying-angle determination values, as shown in FIG. 9, for example.

In the present embodiment, when the start-up rotation angle is less than the set angle (when kick force is applied to the crankshaft), ignition is performed at the regular ignition position θ4B when the parameter T detected immediately before the regular ignition position θ4B is less than the first start-of-delaying-angle determination value Ts1, and ignition is performed at an ignition position angularly delayed according to the extent of the increase of the parameter T when the parameter T detected immediately before the regular ignition position θ4B is equal to or greater than the first start-of-delaying-angle determination value Ts1. The ignition position is the maximum delay angle position θx when the parameter T detected immediately before the regular ignition position θ4B has reached the first end-of-delaying-angle determination value Te1, and engine ignition is stopped in the case that the parameter T exceeds the first end-of-delaying-angle determination value Te1.

When the start-up rotation angle is equal to or greater than the set angle (when kick force is not applied to the crankshaft), ignition is performed at the regular ignition position θ4B when the parameter T detected immediately before the regular ignition position θ4B is less than the second start-of-delaying-angle determination value Ts2, and ignition is performed at an ignition position angularly delayed according to the extent of the increase of the parameter T when the parameter T detected immediately before the regular ignition position θ4B is equal to or greater than the second start-of-delaying-angle determination value Ts2. The ignition position is the maximum delay angle position θx when the parameter T detected immediately before the regular ignition position θ4B has reached the second end-of-delaying-angle determination value Te2, and engine ignition is stopped in the case that the parameter T exceeds the second end-of-delaying-angle determination value Te2.

Third Embodiment

Figure 10:
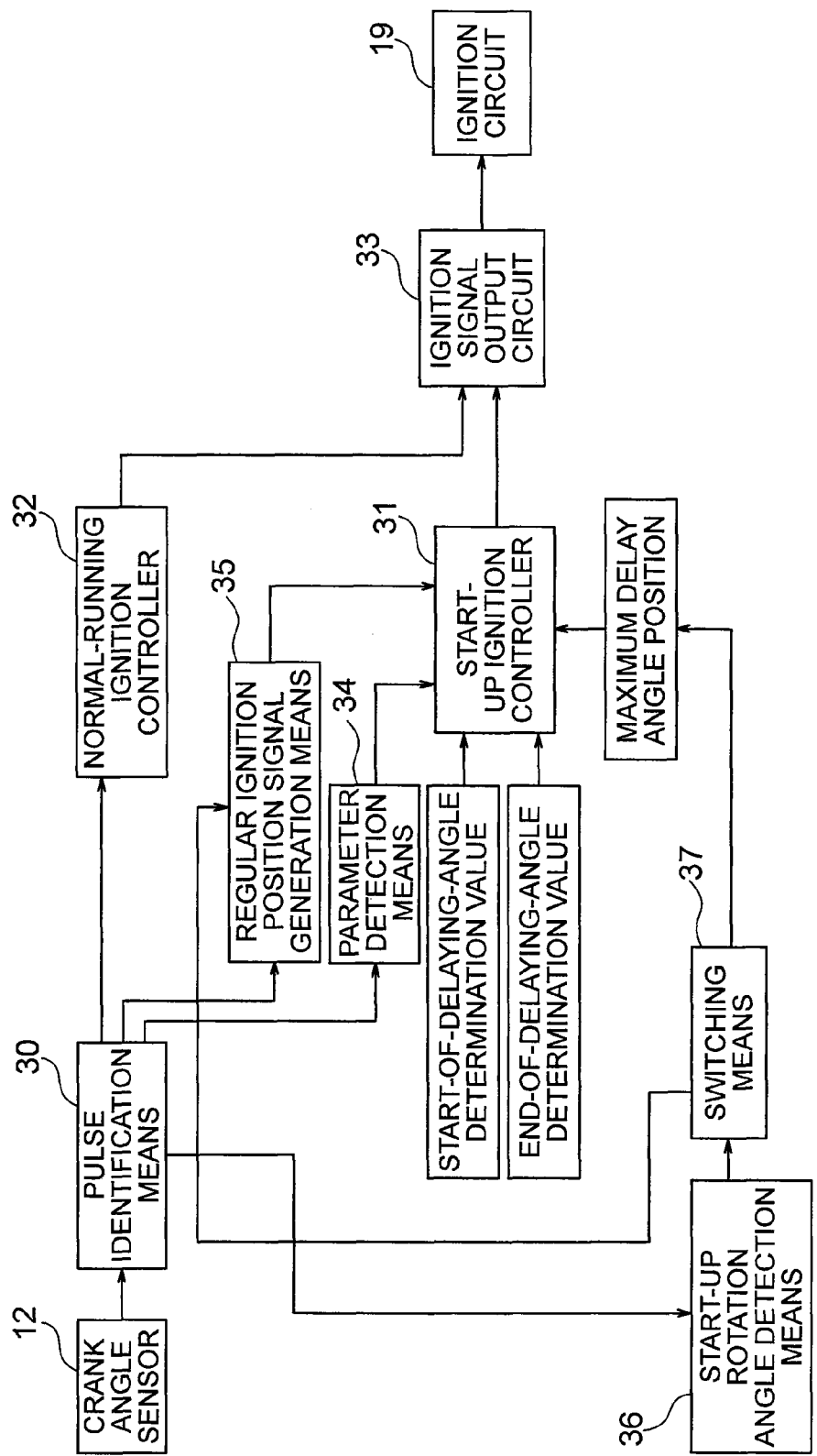
FIG. 10 is a block diagram showing the configuration of the third embodiment of the present invention.

In the above embodiments, the start-of-delaying-angle determination value and end-of-delaying-angle determination value were switched according to the start-up rotation angle detected by the start-up rotation angle detection means 36, but in the third embodiment of the present invention, the regular ignition position and maximum delay angle position at start-up are switched according to the start-up rotation angle detected in the regular ignition position. A block diagram showing the configuration of the ignition control device according to the present embodiment is shown in FIG. 10. The block diagram of FIG. 10 is identical to the block diagram of FIG. 4 except for the switching means 37 being configured so as to switch the regular ignition position and the maximum delay angle position. The reluctor detected by the crank sensor 12 in the present embodiment is the same as the one shown in FIG. 2, and the waveform of the crank angle signal outputted by the crank angle sensor 12 is the same as the one shown in FIG. 3.

Figure 11:
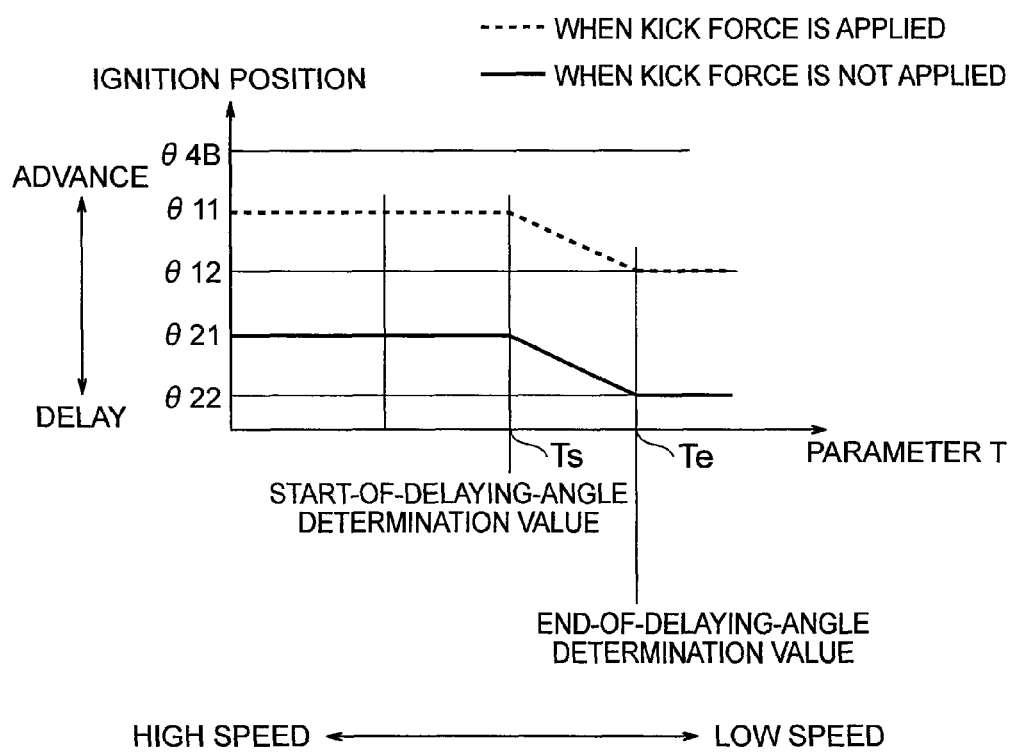
FIG. 11 is a graph showing the relationship between the ignition position and the rotational speed detection parameter in the ignition control device according to the third embodiment of the present invention.

In the present embodiment, in cases in which the start-up rotation angle is less than the set angle (cases in which kick force is applied to the crankshaft) and cases in which the start-up rotation angle is equal to or greater than the set angle (cases in which kick force is not applied to the crankshaft), a single shared start-of-delaying-angle determination value Ts and a single shared end-of-delaying-angle determination value Te are set relative to the parameter T, as are a regular ignition position θ11 and maximum delay angle position θ12 for cases in which kick force is applied to the crankshaft and a regular ignition position θ21 and maximum delay angle position θ22 for cases in which kick force is not applied to the crankshaft, as shown in FIG. 11.

In the present embodiment, when the start-up rotation angle is less than the set angle (a state of kick force being applied to the crankshaft) and the parameter T is less than the start-of-delaying-angle determination value Ts, the ignition position is the regular ignition position θ11 for when kick force is applied, and when the parameter T is equal to or greater than the start-of-delaying-angle determination value Ts, the ignition position is a position delayed relative to the regular ignition position θ11. When the parameter T has reached the end-of-delaying-angle determination value Te in a state of the start-up rotation angle being less than the set angle, the ignition position is the maximum delay angle position θ12 for when kick force is applied.

In the present embodiment, in a state of the start-up rotation angle being equal to or greater than the set angle (kick force not being applied to the crankshaft), the ignition position is the regular ignition position θ21 for when kick force is not applied when the parameter T is less than the start-of-delaying-angle determination value Ts. When the start-up rotation angle is equal to or greater than the set angle and the parameter T is equal to or greater than the start-of-delaying-angle determination value Ts, the ignition position is a position delayed relative to the regular ignition position θ21, and when the parameter T reaches the end-of-delaying-angle determination value Te, the ignition position is the maximum delay angle position θ22 for when kick force is not applied.

Figure 12:
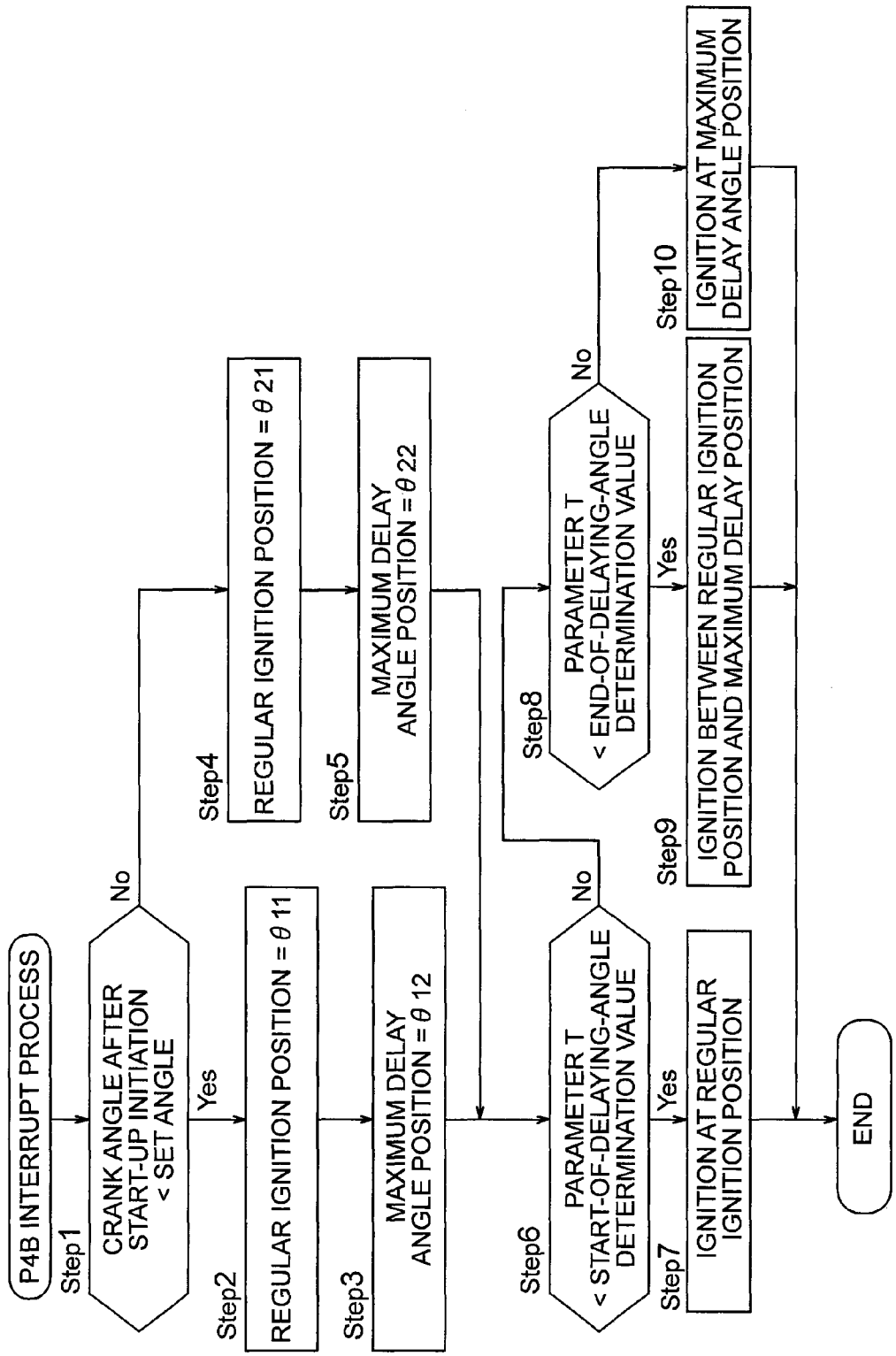
FIG. 12 is a flowchart showing an example of an algorithm of the program executed by a microprocessor in order to realize each of the parts of FIG. 10 in the third embodiment of the present invention.

In the present embodiment, FIG. 12 shows an example of an algorithm of an interrupt process executed by the MPU in order to configure the switching means 37 and the start-up ignition controller 31. The interrupt process of FIG. 12 is a process executed every time the crank angle sensor 12 generates a second reference pulse P4B.

In cases in which this algorithm is used, a determination is made as to whether or not the start-up rotation angle, which is the rotation angle of the crankshaft after start-up initiation in step 1, is less than the set angle (540°). As a result, when the start-up rotation angle is less than the set angle, the process proceeds to step 2 where the regular ignition position θ11 for when kick force is applied is set as the regular ignition position, and in step 3, the maximum delay angle position θ12 for when kick force is applied is set as the maximum delay angle position. When the start-up rotation angle is determined to be equal to or greater than the set angle in step 1, the process proceeds to step 4 where the regular ignition position θ21 for when kick force is not applied is set as the regular ignition position, and in step 5, the maximum delay angle position θ22 for when kick force is not applied is set as the maximum delay angle position. In this example, the switching means 37 is configured by steps 1 through 5.

After step 3 or step 5 has been executed, step 6 is executed, and a determination is made as to whether or not the parameter T detected at the second reference crank angle position θ4B is less than the set start-of-delaying-angle determination value Ts. As a result, when the parameter T is less than the start-of-delaying-angle determination value Ts (when the rotational speed of the engine exceeds the start-of-delaying-angle determination speed), the process proceeds to step 7 and an ignition process is performed for sending an ignition command to the ignition signal output circuit 33 in the set regular ignition position (θ11 or θ21). When it is determined in step 6 that the parameter T is equal to or greater than the start-of-delaying-angle determination value Ts (that the rotational speed of the engine is equal to or less than the start-of-delaying-angle determination speed), the process proceeds to step 8 and a determination is made as to whether or not the parameter T is less than the set end-of-delaying-angle determination value Te. As a result, when the parameter T is determined to be less than the set end-of-delaying-angle determination value Te, the process proceeds to step 9, and a process is performed for setting a measured value for ignition position detection that matches the magnitude of the parameter T in the ignition timer. The measured value for ignition position detection in this case is the time required for the engine to rotate from the regular ignition position (θ11 or θ21) to the angularly delayed ignition position, and is mapped according to the value of the parameter T. In this case, an ignition command is sent to the ignition signal output circuit and an ignition signal is sent to the ignition circuit 19 when the ignition timer has completed measurement of the measured value. When it is determined in step 8 that the parameter T is equal to or greater than the end-of-delaying-angle determination value Te (that the rotational speed is equal to or less than the end-of-delaying-angle determination speed), the process proceeds to step 10 and a process is performed for sending an ignition command to the ignition signal output circuit 33 at the maximum delay angle position (θ12 or θ22). In cases using the algorithm of FIG. 12, the start-up ignition controller 31 is configured by steps 6 through 10.

In the above embodiments, the crank angle sensor detected one stepped reluctor r4 and four reluctors r0 to r3, and the rotation angle of the crankshaft could be detected in 60° units from the pulse outputted by the crank angle sensor, but another option is for the number of non-stepped reluctors to be increased and the rotation angle of the crankshaft to be detected in angle units smaller than 60° (with even higher resolution). Depending on the case, another option is for the number of non-stepped reluctors to be less than three and the rotation angle of the crankshaft to be detected in units larger than 60° units.

In the above embodiments, the start-up rotation angle detection means 36 was configured so as to use the output pulse of the crank angle sensor to detect the rotation angle of the crankshaft, but another option, in cases in which an AC generator is provided with a rotor attached to the crankshaft of the engine, is for a waveform shaping circuit to be provided for converting the output of the AC generator to a phase signal indicating a level change at a zero-crossing point or a peak point thereof, and the start-up rotation angle detection means 36 to be configured so as to detect the rotation angle of the crankshaft from the phase signal obtained from the waveform shaping circuit. With such a configuration, in cases in which a multipolar AC generator is provided, the rotation angle of the crankshaft can be detected with high resolution.

In the above description, a kick starter was given as an example of a start-up device operated by human power, but the present invention can also be applied to cases in which a recoil starter or another form of start-up device is used.

In the above description, a case of a four-stroke engine being started up using human power was used as an example, but the present invention can also be applied to cases in which a two-stroke engine is started up using human power.

SUMMARY

Preferred embodiments of the present invention were described above, but a summary of the invention disclosed in the present specification and drawings is given hereinbelow.

(1) First Invention

The first invention is an engine ignition control device for controlling ignition during start-up and during normal running of an engine started up using human power, the present invention being disclosed in the first through third embodiments.

In the present invention, there are provided a start-up ignition controller having a function for preventing the occurrence of kickback by either delaying an ignition position of the engine or stopping ignition when there is a risk of kickback occurring when the engine is started; start-up rotation angle detection means for detecting as a start-up rotation angle a rotation angle of a crankshaft of the engine after initiation of a start-up operation of the engine; and switching means for switching control specifics of the start-up ignition controller in accordance with the detected start-up rotation angle so that when the start-up rotation angle detected by the start-up rotation angle detection means is less than a set angle, there is created a kickback-preventive effect within a range at which engine startability is not compromised, and when the detected start-up rotation angle is equal to or greater than the set angle, there is created a kickback-preventive effect that is greater than the kickback-preventive effect for when the start-up rotation angle is equal to or less than (*3) the set angle.

(2) Second Invention

The second invention is applied to the first invention, the present invention being disclosed in the first and second embodiments.

In the present invention, the start-up ignition controller is configured so that the rotational speed of the engine is detected at a position immediately before a start-up regular ignition position which is set to a position angularly advanced relative to a crank angle position at which a piston of the engine reaches top dead center, the engine is ignited at the regular ignition position when the detected rotational speed is higher than a preset determination speed, and the engine is ignited at an ignition position angularly delayed by an delaying angle amount that matches the rotational speed within a range that does not exceed a maximum delay angle position set to a position angularly delayed relative to the regular ignition position when the detected rotational speed is equal to or less than the determination speed. The switching means is configured so as to switch the determination speed in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

(3) Third Invention

The third invention is applied to the first invention, the present invention being disclosed in the third embodiment.

In the present invention, the start-up ignition controller and the switching means are configured as shown below. The start-up ignition controller is configured so that the rotational speed of the engine is detected at a position immediately before a start-up regular ignition position which is set to a position angularly advanced relative to a crank angle position at which a piston of the engine reaches top dead center, the ignition position of the engine is the regular ignition position when the detected rotational speed is higher than a preset determination speed, and the ignition position of the engine is angularly delayed by an delaying angle amount that matches the detected rotational speed within a range that does not exceed a maximum delay angle position set to a position angularly delayed relative to the regular ignition position when the detected rotational speed is equal to or less than the determination speed.

The switching means is configured so as to switch the regular ignition position and the maximum delay angle position at the start-up in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

(4) Fourth Invention

The fourth invention is applied to the second invention and is disclosed in the first and second embodiments.

In the present invention, parameter detection means are provided for detecting the time required for the crankshaft to rotate through a certain crank angle section immediately before the start-up regular ignition position as a rotational speed detection parameter including information of the rotational speed of the engine. In this case, the start-up ignition controller is configured so as to determine that the rotational speed of the engine is equal to or less than the determination speed when the value of the parameter is equal to or greater than a preset determination value.

(5) Fifth Invention

The fifth invention is applied to the third invention, the present invention being disclosed in the third embodiment.

In the present invention, parameter detection means are provided for detecting the time required for the crankshaft to rotate through a certain crank angle section immediately before the start-up regular ignition position as a rotational speed detection parameter including information of the rotational speed of the engine, and the start-up ignition controller is configured so as to determine that the rotational speed of the engine is equal to or less than the determination speed when the value of the parameter is equal to or greater than a preset determination value.

(6) Sixth Invention

The sixth invention is applied to the second invention and is disclosed in the first and second embodiments.

In the present invention, a crank angle sensor is provided for generating pulse signals at a plurality of pre-established rotation angle positions of the crankshaft of the engine, and the start-up rotation angle detection means is configured so as to detect the start-up rotation angle from an output pulse of the crank angle sensor. The start-up ignition controller is configured so as to detect the regular ignition position and the maximum delay angle position from the output pulse of the crank angle sensor.

(7) Seventh Invention

The seventh invention is applied to the third invention and is disclosed in the third embodiment.

In the present invention, there is provided a crank angle sensor for generating pulse signals at a plurality of pre-established rotation angle positions of the crankshaft of the engine, and the start-up rotation angle detection means is configured so as to detect the start-up rotation angle from an output pulse of the crank angle sensor. The start-up ignition controller is configured so as to detect the regular ignition position and the maximum delay angle position from the output pulse of the crank angle sensor.

(8) Eighth Invention

The eighth invention is applied to the second invention. In the present invention, there are provided an AC generator having a rotor attached to the crankshaft of the engine, and a waveform shaping circuit for converting an output of the AC generator to a phase signal indicating a level change at a zero-crossing point or a peak point; and the start-up rotation angle detection means is configured so as to detect the rotation angle of the crankshaft from the phase signal.

(9) Ninth Invention

The ninth invention is applied to the third invention. In the present invention, there is provided an AC generator having a rotor attached to the crankshaft of the engine, and a waveform shaping circuit for converting an output of the AC generator to a phase signal indicating a level change at a zero-crossing point or a peak point; and the start-up rotation angle detection means is configured so as to detect the start-up rotation angle from the phase signal.

(10) Tenth Invention

The tenth invention is applied to the fourth invention and is disclosed by the first and second embodiments.

In the present invention, there is provided a crank angle sensor for generating a first reference pulse at a first reference crank angle position set to a position angularly advanced relative to the crank angle position equivalent to top dead center of the piston of the engine, generating a second reference pulse at a second reference crank angle position set to a position delayed relative to the generated position of the first reference pulse and advanced relative to the crank angle position equivalent to top dead center of the piston of the engine, generating a third reference pulse at a third reference crank angle position delayed relative to the crank angle position equivalent to top dead center, and further generating a plurality of pulses in a section from the third reference crank angle position to the first reference crank angle position. In this case, the start-up ignition controller detects the position where the second reference pulse is generated and the position where the third reference pulse is generated by the crank angle sensor as the start-up regular ignition position and the maximum delay angle position respectively of the engine, and the parameter detection means detects the time required for the crankshaft to rotate from the first reference crank angle position to the second reference crank angle position as the rotational speed detection parameter.

(11) Eleventh Invention

The eleventh invention is applied to the fifth invention and is disclosed by the third embodiment.

In the present invention, there is provided a crank angle sensor for generating a first reference pulse at a first reference crank angle position set to a position angularly advanced relative to the crank angle position equivalent to top dead center of the piston of the engine, generating a second reference pulse at a second reference crank angle position set to a position delayed relative to the generated position of the first reference pulse and advanced relative to the crank angle position equivalent to top dead center of the piston of the engine, generating a third reference pulse at a third reference crank angle position delayed relative to the crank angle position equivalent to top dead center, and further generating a plurality of pulses in a section from the third reference crank angle position to the first reference crank angle position. The start-up ignition controller uses the second reference pulse as a reference to detect the start-up regular ignition position and the maximum delay angle position of the engine, and the parameter detection means detects as the rotational speed detection parameter the time required for the crankshaft to rotate from the first reference crank angle position to the second reference crank angle position.

(12) Twelfth Invention

The twelfth invention is applied to an engine ignition control device having a start-up ignition controller for controlling ignition at start-up of an engine started up using human power and a normal-running ignition controller for controlling ignition during normal running, and is disclosed by the first embodiment.

In the present invention, provided are parameter detection means for detecting, as a rotational speed detection parameter including information of the rotational speed of the engine, the time required for a crankshaft to rotate through a certain crank angle section immediately before a start-up regular ignition position, the start-up regular ignition position being set to a position angularly advanced relative to a crank angle position equivalent to a top dead center of a piston of the engine; and start-up rotation angle detection means for detecting as a start-up rotation angle the rotation angle of the crankshaft of the engine from the time a start-up operation of the engine is initiated. In this case, the start-up ignition controller is configured so that the engine is ignited at the regular ignition position when the parameter is less than a preset start-of-delaying-angle determination value, the engine is ignited at an ignition position delayed relative to the regular ignition position by an delaying angle amount that matches the magnitude of the parameter when the parameter is within a range equal to or greater than the start-of-delaying-angle determination value and equal to or less than a set end-of-delaying-angle determination value (greater than the start-of-delaying-angle determination value), and ignition of the engine is in the maximum delay angle position when the parameter has reached the end-of-delaying-angle determination value. Switching means is provided for switching the start-of-delaying-angle determination value and the end-of-delaying-angle determination value in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

(13) Thirteenth Invention

The thirteenth invention relates to an engine ignition control device having a start-up ignition controller for controlling ignition at start-up of an engine started up using human power and a normal-running ignition controller for controlling ignition during normal running, and is disclosed by the third embodiment.

In the present invention, provided are parameter detection means for detecting, as a rotational speed detection parameter including information of the rotational speed of the engine, the time required for a crankshaft to rotate through a certain crank angle section immediately before a start-up regular ignition position, the start-up regular ignition position being set to a position angularly advanced relative to a crank angle position equivalent to a top dead center of a piston of the engine, and start-up rotation angle detection means for detecting as a start-up rotation angle the rotation angle of the crankshaft of the engine from the time a start-up operation of the engine is initiated. The start-up ignition controller is configured so that the engine is ignited at the regular ignition position when the parameter is less than a start-of-delaying-angle determination value, the engine is ignited at an ignition position delayed relative to the regular ignition position by an delaying angle amount that matches the magnitude of the parameter when the parameter is within a range equal to or greater than the start-of-delaying-angle determination value and equal to or less than a end-of-delaying-angle determination value (greater than the start-of-delaying-angle determination value), and the engine is ignited in the maximum delay angle position when the parameter has reached the end-of-delaying-angle determination value. There is also provided switching means for switching the regular ignition position and the maximum delay angle position in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

(14) Fourteenth Invention

The fourteenth invention is applied to the twelfth invention. In the present invention, there is provided a crank angle sensor for generating a first reference pulse at a first reference crank angle position set to a position sufficiently angularly advanced relative to the crank angle position equivalent to top dead center of the piston of the engine, generating a second reference pulse at a second reference crank angle position set to a position immediately before the crank angle position equivalent to top dead center of the piston of the engine, generating a third reference pulse at a third reference crank angle position slightly delayed relative to the crank angle position equivalent to top dead center, and further generating a plurality of pulses in a section from the third reference crank angle position to the first reference crank angle position. The start-up ignition controller detects, as the start-up regular ignition position and the maximum delay angle position respectively of the engine, the position where the second reference pulse is generated and the position where the third reference pulse is generated by the crank angle sensor; and the parameter detection means detects the time required for the crankshaft to rotate from the first reference crank angle position to the second reference crank angle position as the rotational speed detection parameter. The start-up rotation angle detection means detects the start-up rotation angle from the pulse generated by the crank angle sensor.

(15) Fifteenth Invention

The fifteenth invention is applied to the thirteenth invention. In the present invention, there is provided a crank angle sensor for generating a first reference pulse at a first reference crank angle position set to a position sufficiently angularly advanced relative to the crank angle position equivalent to top dead center of the piston of the engine, generating a second reference pulse at a second reference crank angle position set to a position immediately before the crank angle position equivalent to top dead center of the piston of the engine, and further generating a plurality of pulses in a section from the second reference crank angle position to the first reference crank angle position. The start-up ignition controller uses the second reference pulse as a reference to detect the start-up regular ignition position and the maximum delay angle position of the engine, and the parameter detection means detects the time required for the crankshaft to rotate from the first reference crank angle position to the second reference crank angle position as the rotational speed detection parameter. The start-up rotation angle detection means detects the start-up rotation angle from the pulse generated by the crank angle sensor.

The present invention makes it possible to prevent the occurrence of kickback without compromising the startability of an engine in cases in which an engine is started up using human power, and increases the additional value of an engine started up using human power; therefore, the present invention has great industrial applicability.

What is claimed is:

1. An engine ignition control device for controlling ignition at start-up and during normal running of an engine started up using human power;

the engine ignition control device comprising:

a start-up ignition controller having a function for preventing the occurrence of kickback by either delaying an ignition position of the engine or stopping ignition when there is a risk of kickback occurring when the engine is started;

start-up rotation angle detection means for detecting as a start-up rotation angle a rotation angle of a crankshaft of the engine after initiation of a start-up operation of the engine; and switching means for switching control specifics of the start-up ignition controller in accordance with the detected start-up rotation angle so that when the start-up rotation angle detected by the start-up rotation angle detection means is less than a set angle, there is created a kickback-preventive effect within a range at which engine startability is not compromised, and when the detected start-up rotation angle is equal to or greater than the set angle, there is created a kickback-preventive effect that is greater than the kickback-preventive effect for when the start-up rotation angle is equal to or less than the set angle.

2. The engine ignition control device of claim 1, wherein the start-up ignition controller is configured so that the rotational speed of the engine is detected at a position immediately before a start-up regular ignition position which is set to a position angularly advanced relative to a crank angle position at which a piston of the engine reaches top dead center, the ignition position of the engine is the regular ignition position when the detected rotational speed is higher than a preset determination speed, and the ignition position of the engine is angularly delayed by an delaying angle amount that matches the detected rotational speed within a range that does not exceed a maximum delay angle position set to a position angularly delayed relative to the regular ignition position when the detected rotational speed is equal to or less than the determination speed; and the switching means is configured so as to switch the determination speed in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

3. The engine ignition control device of claim 1, wherein the start-up ignition controller is configured so that the rotational speed of the engine is detected at a position immediately before a start-up regular ignition position which is set to a position angularly advanced relative to a crank angle position at which a piston of the engine reaches top dead center, the ignition position of the engine is the regular ignition position when the detected rotational speed is higher than a preset determination speed, and the ignition position of the engine is angularly delayed by an delaying angle amount that matches the detected rotational speed within a range that does not exceed a maximum delay angle position set to a position angularly delayed relative to the regular ignition position when the detected rotational speed is equal to or less than the determination speed; and the switching means is configured so as to switch the regular ignition position and the maximum delay angle position at the start-up in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

4. The engine ignition control device of claim 2, comprising parameter detection means for detecting the time required for the crankshaft to rotate through a certain crank angle section immediately before the start-up regular ignition position as a rotational speed detection parameter including information of the rotational speed of the engine;

wherein the start-up ignition controller is configured so as to determine that the rotational speed of the engine is equal to or less than the determination speed when the value of the parameter is equal to or greater than a preset determination value.

5. The engine ignition control device of claim 3, comprising parameter detection means for detecting the time required for the crankshaft to rotate through a certain crank angle section immediately before the start-up regular ignition position as a rotational speed detection parameter including information of the rotational speed of the engine;

wherein the start-up ignition controller is configured so as to determine that the rotational speed of the engine is equal to or less than the determination speed when the value of the parameter is equal to or greater than a preset determination value.

6. The engine ignition control device of claim 2, wherein a crank angle sensor is provided for generating pulse signals at a plurality of pre-established rotation angle positions of the crankshaft of the engine;

the start-up rotation angle detection means detects the start-up rotation angle from an output pulse of the crank angle sensor; and the start-up ignition controller is configured so as to detect the regular ignition position and the maximum delay angle position from the output pulse of the crank angle sensor.

7. The engine ignition control device of claim 3, wherein there is provided a crank angle sensor for generating pulse signals at a plurality of pre-established rotation angle positions of the crankshaft of the engine;

the start-up rotation angle detection means detects the start-up rotation angle from an output pulse of the crank angle sensor; and the start-up ignition controller is configured so as to detect the regular ignition position and the maximum delay angle position from the output pulse of the crank angle sensor.

8. The engine ignition control device of claim 2, wherein there are provided an AC generator having a rotor attached to the crankshaft of the engine; and a waveform shaping circuit for converting an output of the AC generator to a phase signal indicating a level change at a zero-crossing point or a peak point; and the start-up rotation angle detection means is configured so as to detect the rotation angle of the crankshaft from the phase signal.

9. The engine ignition control device of claim 3, wherein there is provided an AC generator having a rotor attached to the crankshaft of the engine, and a waveform shaping circuit for converting an output of the AC generator to a phase signal indicating a level change at a zero-crossing point or a peak point; and the start-up rotation angle detection means is configured so as to detect the start-up rotation angle from the phase signal.

10. The engine ignition control device of claim 4, wherein there is provided a crank angle sensor for generating a first reference pulse at a first reference crank angle position set to a position angularly advanced relative to the crank angle position equivalent to top dead center of the piston of the engine, generating a second reference pulse at a second reference crank angle position set to a position delayed relative to the generated position of the first reference pulse and advanced relative to the crank angle position equivalent to top dead center of the piston of the engine, generating a third reference pulse at a third reference crank angle position delayed relative to the crank angle position equivalent to top dead center, and further generating a plurality of pulses in a section from the third reference crank angle position to the first reference crank angle position; and the start-up ignition controller detects the position where the second reference pulse is generated and the position where the third reference pulse is generated by the crank angle sensor as the start-up regular ignition position and the maximum delay angle position respectively of the engine, and the parameter detection means detects the time required for the crankshaft to rotate from the first reference crank angle position to the second reference crank angle position as the rotational speed detection parameter.

11. The engine ignition control device of claim 5, wherein there is provided a crank angle sensor for generating a first reference pulse at a first reference crank angle position set to a position angularly advanced relative to the crank angle position equivalent to top dead center of the piston of the engine, generating a second reference pulse at a second reference crank angle position set to a position delayed relative to the generated position of the first reference pulse and advanced relative to the crank angle position equivalent to top dead center of the piston of the engine, generating a third reference pulse at a third reference crank angle position delayed relative to the crank angle position equivalent to top dead center, and further generating a plurality of pulses in a section from the third reference crank angle position to the first reference crank angle position; and the start-up ignition controller uses the second reference pulse as a reference to detect the start-up regular ignition position and the maximum delay angle position of the engine, and the parameter detection means detects as the rotational speed detection parameter the time required for the crankshaft to rotate from the first reference crank angle position to the second reference crank angle position.

12. An engine ignition control device having a start-up ignition controller for controlling ignition at start-up of an engine started up using human power and a normal-running ignition controller for controlling ignition during normal running;

the engine ignition control device comprising parameter detection means for detecting, as a rotational speed detection parameter including information of the rotational speed of the engine, the time required for a crankshaft to rotate through a certain crank angle section immediately before a start-up regular ignition position, the start-up regular ignition position being set to a position angularly advanced relative to a crank angle position equivalent to a top dead center of a piston of the engine; and start-up rotation angle detection means for detecting as a start-up rotation angle the rotation angle of the crankshaft of the engine from the time a start-up operation of the engine is initiated; wherein the start-up ignition controller is configured so that the engine is ignited at the regular ignition position when the parameter is less than a preset start-of-delaying-angle determination value, the engine is ignited at an ignition position delayed relative to the regular ignition position by an delaying angle amount that matches the magnitude of the parameter when the parameter is within a range equal to or greater than the start-of-delaying-angle determination value and equal to or less than a set end-of-delaying-angle determination value (greater than the start-of-delaying-angle determination value), and ignition of the engine is in the maximum delay angle position when the parameter has reached the end-of-delaying-angle determination value; and switching means is provided for switching the start-of-delaying-angle determination value and the end-of-delaying-angle determination value in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

13. An engine ignition control device having a start-up ignition controller for controlling ignition at start-up of an engine started up using human power and a normal-running ignition controller for controlling ignition during normal running;

the engine ignition control device comprising parameter detection means for detecting, as a rotational speed detection parameter including information of the rotational speed of the engine, the time required for a crankshaft to rotate through a certain crank angle section immediately before a start-up regular ignition position, the start-up regular ignition position being set to a position angularly advanced relative to a crank angle position equivalent to a top dead center of a piston of the engine, and start-up rotation angle detection means for detecting as a start-up rotation angle the rotation angle of the crankshaft of the engine from the time a start-up operation of the engine is initiated; wherein the start-up ignition controller is configured so that the engine is ignited at the regular ignition position when the parameter is less than a start-of-delaying-angle determination value, the engine is ignited at an ignition position delayed relative to the regular ignition position by an delaying angle amount that matches the magnitude of the parameter when the parameter is within a range equal to or greater than the start-of-delaying-angle determination value and equal to or less than a end-of-delaying-angle determination value (greater than the start-of-delaying-angle determination value), and the engine is ignited in the maximum delay angle position when the parameter has reached the end-of-delaying-angle determination value; and there is provided switching means for switching the regular ignition position and the maximum delay angle position in accordance with the detected start-up rotation angle such that when the start-up rotation angle detected by the start-up rotation angle detection means at the regular ignition position is less than a set angle, there is created a kickback-preventive effect within a range at which engine startability is not compromised, and when the start-up rotation angle detected by the start-up rotation angle detection means at the regular ignition position is equal to or greater than the set angle, there is created a kickback-preventive effect that is greater than the kickback-preventive effect for when the start-up rotation angle is less than the set angle.

14. The engine ignition control device of claim 12, wherein there is provided a crank angle sensor for generating a first reference pulse at a first reference crank angle position set to a position sufficiently angularly advanced relative to the crank angle position equivalent to top dead center of the piston of the engine, generating a second reference pulse at a second reference crank angle position set to a position immediately before the crank angle position equivalent to top dead center of the piston of the engine, generating a third reference pulse at a third reference crank angle position slightly delayed relative to the crank angle position equivalent to top dead center, and further generating a plurality of pulses in a section from the third reference crank angle position to the first reference crank angle position;

the start-up ignition controller detects, as the start-up regular ignition position and the maximum delay angle position respectively of the engine, the position where the second reference pulse is generated and the position where the third reference pulse is generated by the crank angle sensor; and the parameter detection means detects the time required for the crankshaft to rotate from the first reference crank angle position to the second reference crank angle position as the rotational speed detection parameter; and the start-up rotation angle detection means detects the start-up rotation angle from the pulse generated by the crank angle sensor.

15. The engine ignition control device of claim 13, wherein there is provided a crank angle sensor for generating a first reference pulse at a first reference crank angle position set to a position sufficiently angularly advanced relative to the crank angle position equivalent to top dead center of the piston of the engine, generating a second reference pulse at a second reference crank angle position set to a position immediately before the crank angle position equivalent to top dead center of the piston of the engine, and further generating a plurality of pulses in a section from the second reference crank angle position to the first reference crank angle position;

the start-up ignition controller uses the second reference pulse as a reference to detect the start-up regular ignition position and the maximum delay angle position of the engine, and the parameter detection means detects the time required for the crankshaft to rotate from the first reference crank angle position to the second reference crank angle position as the rotational speed detection parameter; and the start-up rotation angle detection means detects the start-up rotation angle from the pulse generated by the crank angle sensor.

\* \* \* \* \*

UNITED STATES PATENT AND TRADEMARK OFFICE
CERTIFICATE OF CORRECTION

PATENT NO. : 8,656,882 B2  Page 1 of 1
APPLICATION NO. : 13/575451
DATED : February 25, 2014
INVENTOR(S) : Hiroyasu Sato et al.

It is certified that error appears in the above-identified patent and that said Letters Patent is hereby corrected as shown below:

In the Specification

Column 6, line 48, please delete "84A" and insert --Θ4A--

Column 15, line 15, please delete "84B" and insert --Θ4B--

Signed and Sealed this
Third Day of June, 2014

Michelle K. Lee
*Deputy Director of the United States Patent and Trademark Office*